United States Patent
Minto

(10) Patent No.: US 10,107,495 B2
(45) Date of Patent: Oct. 23, 2018

(54) GAS TURBINE COMBUSTOR CONTROL SYSTEM FOR STOICHIOMETRIC COMBUSTION IN THE PRESENCE OF A DILUENT

(71) Applicants: General Electric Company, Schenectady, NY (US); ExxonMobil Upstream Research Company, Houston, TX (US)

(72) Inventor: Karl Dean Minto, Ballston Lake, NY (US)

(73) Assignees: General Electric Company, Schenectady, NY (US); ExxonMobil Upstream Research Company, Spring, TX (US)

( * ) Notice: Subject to any disclaimer, the term of this patent is extended or adjusted under 35 U.S.C. 154(b) by 669 days.

(21) Appl. No.: 14/066,551

(22) Filed: Oct. 29, 2013

(65) Prior Publication Data

US 2014/0123624 A1    May 8, 2014

Related U.S. Application Data

(60) Provisional application No. 61/747,194, filed on Dec. 28, 2012, provisional application No. 61/722,118, (Continued)

(51) Int. Cl.
*F23N 5/18* (2006.01)
*F02C 1/00* (2006.01)
(Continued)

(52) U.S. Cl.
CPC ............... *F23N 5/18* (2013.01); *F02C 1/005* (2013.01); *F02C 1/08* (2013.01); *F02C 3/34* (2013.01);
(Continued)

(58) Field of Classification Search
CPC ............... F02C 1/005; F02C 1/08; F02C 3/34
See application file for complete search history.

(56) References Cited

U.S. PATENT DOCUMENTS

| | | | |
|---|---|---|---|
| 2,488,911 A | 11/1949 | Hepburn et al. | |
| 2,884,758 A | 5/1959 | Oberle | |

(Continued)

FOREIGN PATENT DOCUMENTS

| | | |
|---|---|---|
| CA | 2231749 | 9/1998 |
| CA | 2645450 | 9/2007 |

(Continued)

OTHER PUBLICATIONS

Mittricker, WO 2010044958 A1.*

(Continued)

*Primary Examiner* — Gerald L Sung
*Assistant Examiner* — Scott Walthour
(74) *Attorney, Agent, or Firm* — Fletcher Yoder P.C.

(57) ABSTRACT

In one embodiment, a gas turbine system includes a controller configured to receive fuel composition information related to a fuel used for combustion in a turbine combustor; receive oxidant composition information related to an oxidant used for combustion in the turbine combustor; receive oxidant flow information related to a flow of the oxidant to the turbine combustor; determine a stoichiometric fuel-to-oxidant ratio based at least on the fuel composition information and the oxidant composition information; and generate a control signal for input to a fuel flow control system configured to control a flow of the fuel to the turbine combustor based on the oxidant flow information, a target equivalence ratio, and the stoichiometric fuel-to-oxidant ratio to enable combustion at the target equivalence ratio in the presence of an exhaust diluent within the turbine combustor.

19 Claims, 9 Drawing Sheets

Related U.S. Application Data filed on Nov. 2, 2012, provisional application No. 61/722,115, filed on Nov. 2, 2012, provisional application No. 61/722,114, filed on Nov. 2, 2012, provisional application No. 61/722,111, filed on Nov. 2, 2012.

(51) Int. Cl.

| | | |
|---|---|---|
| *F23N 1/00* | (2006.01) | |
| *F02C 9/28* | (2006.01) | |
| *F02C 9/26* | (2006.01) | |
| *F02C 1/08* | (2006.01) | |
| *F23N 5/00* | (2006.01) | |
| *F02C 7/22* | (2006.01) | |
| *F23C 9/08* | (2006.01) | |
| *F02C 3/34* | (2006.01) | |
| *F02C 6/18* | (2006.01) | |
| *F02C 9/50* | (2006.01) | |
| *F02C 9/48* | (2006.01) | |

(52) U.S. Cl.
CPC .............. *F02C 6/18* (2013.01); *F02C 7/22* (2013.01); *F02C 9/26* (2013.01); *F02C 9/28* (2013.01); *F23C 9/08* (2013.01); *F23N 1/00* (2013.01); *F23N 1/002* (2013.01); *F23N 5/00* (2013.01); *F23N 5/003* (2013.01); *F23N 5/006* (2013.01); *F02C 9/48* (2013.01); *F02C 9/50* (2013.01); *F23N 2021/10* (2013.01); *F23N 2023/36* (2013.01); *F23N 2041/20* (2013.01); *Y02E 20/16* (2013.01)

(56) References Cited

U.S. PATENT DOCUMENTS

| | | |
|---|---|---|
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis, III et al. |
| 3,949,548 A | 4/1976 | Lockwood, Jr. |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz, III |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |

(56) References Cited

U.S. PATENT DOCUMENTS

| | | |
|---|---|---|
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson, Jr. et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray, Jr. |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen |
| 6,370,870 B1 | 4/2002 | Kamijo et al. |
| 6,374,591 B1 | 4/2002 | Johnson |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray, Jr. |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier, Jr. |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier, Jr. |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol, Sr. |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |

(56) References Cited

U.S. PATENT DOCUMENTS

| | | |
|---|---|---|
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear, Jr. et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman, II et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Dalla Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Huntley Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |

(56) References Cited

U.S. PATENT DOCUMENTS

| | | |
|---|---|---|
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,381,506 B2 | 2/2013 | Bhatnagar et al. |
| 8,388,919 B2 | 3/2013 | Hooper et al. |
| 8,396,643 B2 | 3/2013 | Nomura et al. |
| 8,397,482 B2 | 3/2013 | Kraemer et al. |
| 8,398,757 B2 | 3/2013 | Lijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,560,205 B2 | 10/2013 | Nomura et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 9,222,671 B2 | 12/2015 | Mittricker et al. |
| 9,719,682 B2 | 8/2017 | Mittricker et al. |
| 2001/0000049 A1 | 3/2001 | Kataoka et al. |
| 2001/0029732 A1 | 10/2001 | Bachmann |
| 2001/0045090 A1 | 11/2001 | Gray, Jr. |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2005/0274116 A1 | 12/2005 | Thornton et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245707 A1* | 10/2007 | Pashley .................. F02C 9/26 60/39.27 |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |

(56) References Cited

U.S. PATENT DOCUMENTS

| | | |
|---|---|---|
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare |
| 2008/0251234 A1 | 10/2008 | Wilson |
| 2008/0290719 A1 | 11/2008 | Kaminsky et al. |
| 2008/0309087 A1 | 12/2008 | Evulet et al. |
| 2009/0000762 A1 | 1/2009 | Wilson |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0125207 A1* | 5/2009 | Nomura ............... F02C 3/22 701/100 |
| 2009/0157230 A1 | 6/2009 | Hibshman, II et al. |
| 2009/0193809 A1 | 8/2009 | Schroder et al. |
| 2009/0205334 A1 | 8/2009 | Aljabari et al. |
| 2009/0218821 A1 | 9/2009 | Elkady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1* | 5/2010 | Brautsch ............... F02C 3/30 60/772 |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0229524 A1 | 9/2010 | Bhatnagar et al. |
| 2010/0276148 A1* | 11/2010 | Wylie ............... E21B 43/24 166/303 |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | Elkady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0126545 A1* | 6/2011 | Loeven, II ............... F02C 7/22 60/772 |
| 2011/0138766 A1 | 6/2011 | Elkady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0036863 A1 | 2/2012 | Kirzhner et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |

FOREIGN PATENT DOCUMENTS

| | | | |
|---|---|---|---|
| CN | 101307720 A | 11/2008 | |
| CN | 101900034 A | 12/2010 | |
| CN | 102177326 A | 9/2011 | |
| CN | 102454486 A | 5/2012 | |
| CN | 102635860 A | 8/2012 | |
| EP | 0770771 | 5/1997 | |
| EP | 2187023 A1 | 5/2010 | |
| GB | 776269 | 6/1957 | |
| GB | 2117053 | 10/1983 | |
| GB | 2485043 A | 5/2012 | |
| JP | 2010209332 A | 9/2010 | |
| WO | WO1999006674 | 2/1999 | |
| WO | WO1999063210 | 12/1999 | |
| WO | WO2007068682 | 6/2007 | |
| WO | WO2008142009 | 11/2008 | |
| WO | WO 2010044958 A1 * | 4/2010 | ............... F23C 9/00 |
| WO | WO2011003606 | 1/2011 | |
| WO | WO2012003489 | 1/2012 | |
| WO | 2012018457 A1 | 2/2012 | |
| WO | WO2012128928 | 9/2012 | |
| WO | WO2012128929 | 9/2012 | |
| WO | WO2012170114 | 12/2012 | |
| WO | WO2013147632 | 10/2013 | |
| WO | WO2013147633 | 10/2013 | |

(56) References Cited

FOREIGN PATENT DOCUMENTS

| WO | WO2013155214 | 10/2013 |
|----|--------------|---------|
| WO | WO2013163045 | 10/2013 |

OTHER PUBLICATIONS

Cho, J. H. et al. (2005) "Marrying LNG and Power Generation," Energy Markets; 10, 8; ABI/INFORM Trade & Industry, 5 pgs.

Corti, A. et al. (1988) "Athabasca Mineable Oil Sands: The RTR/Gulf Extraction Process Theoretical Model of Bitumen Detachment," 4th UNITAR/UNDP Int'l Conf. on Heavy Crude and Tar Sands Proceedings, v.5, paper No. 81, Edmonton, AB, Canada, 4 pgs.

Nanda, R. et al. (2007) "Utilizing Air Based Technologies as Heat Source for LNG Vaporization," presented at the 86th Annual convention of the Gas Processors of America (GPA 2007), , San Antonio, TX; 13 pgs.

Rosetta, M. J. et al. (2006) "Integrating Ambient Air Vaporization Technology with Waste Heat Recovery—A Fresh Approach to LNG Vaporization," presented at the 85th annual convention of the Gas Processors of America (GPA 2006), Grapevine, Texas, 22 pgs.

International Search Report and Written Opinion issued in connection with corresponding PCT Application No. PCT/US2013/067824 dated Jul. 18, 2014.

Ahmed, S. et al. (1998) "Catalytic Partial Oxidation Reforming of Hydrocarbon Fuels," *1998 Fuel Cell Seminar*, Nov. 16-19, 1998, 7 pgs.

Air Separation Technology Ion Transport Membrane—Air Products 2008.

Air Separation Technology Ion Transport Membrane—Air Products 2011.

Anderson, R. E. (2006) "Durability and Reliability Demonstration of a Near-Zero-Emission Gas-Fired Power Plant," *California Energy Comm.*, CEC 500-2006-074, 80 pgs.

Baxter, E. et al. (2003) "Fabricate and Test an Advanced Non-Polluting Turbine Drive Gas Generator," *U. S. Dept. of Energy, Nat'l Energy Tech. Lab.*, DE-FC26-00NT 40804, 51 pgs.

Bolland, O. et al. (1998) "Removal of CO2 From Gas Turbine Power Plants Evaluation of Pre- and Postcombustion Methods," SINTEF Group, 1998, www.energy.sintef.no/publ/xergi/98/3/art-8engelsk.htm, 11 pgs.

BP Press Release (2006) "BP and Edison Mission Group Plan Major Hydrogen Power Project for California," Feb. 10, 2006, www.bp.com/hydrogenpower, 2 pgs.

Bryngelsson, M. et al. (2005) "Feasibility Study of CO2 Removal From Pressurized Flue Gas in a Fully Fired Combined Cycle—The Sargas Project," KTH—Royal Institute of Technology, Dept. of Chemical Engineering and Technology, 9 pgs.

Clark, Hal (2002) "Development of a Unique Gas Generator for a Non-Polluting Power Plant," California Energy Commission Feasibility Analysis, P500-02-011F, Mar. 2002, 42 pgs.

Comparison of Ion Transport Membranes—Fourth Annual Conference on Carbon Capture and Sequestration DOE/NETL; May 2005.

Ciulia, Vincent. About.com. Auto Repair. How the Engine Works. 2001-2003.

Cryogenics. Science Clarified. 2012. http://www.scienceclarified.com/Co-Di/Cryogenics.html.

Defrate, L. A. et al. (1959) "Optimum Design of Ejector Using Digital Computers" Chem. Eng. Prog. Symp. Ser., 55 ( 21) pp. 46.

Ditaranto, M. et al. (2006) "Combustion Instabilities in Sudden Expansion Oxy-Fuel Flames," ScienceDirect, Combustion and Flame, v.146, Jun. 30, 2006, pp. 493-451.

Elwell, L. C. et al. (2005) "Technical Overview of Carbon Dioxide Capture Technologies for Coal-Fired Power Plants," *MPR Associates, Inc.*, Jun. 22, 2005, 15 pgs.

Eriksson, Sara. Licentiate Thesis 2005, p. 22. KTH—"Development of Methane Oxidation Catalysts for Different Gas Turbine Combustor Concepts." The Royal Institute of Technology, Department of Chemical Engineering and Technology, Chemical Technology, Stockholm Sweden.

Ertesvag, I. S. et al. (2005) "Energy Analysis of a Gas-Turbin Combined-Cycle Power Plant With Precombustion $CO_2$ Capture," Elsivier, 2004, pp. 5-39.

Evulet, Andrei T. et al. "Application of Exhaust Gas Recirculation in a DLN F-Class Combustion System for Postcombustion Carbon Capture" ASME J. Engineering for Gas Turbines and Power, vol. 131, May 2009.

Evulet, Andrei T. et al. "On the Performance and Operability of GE's Dry Low Nox Combustors utilizing Exhaust Gas Recirculation for Post-Combustion Carbon Capture" Energy Procedia I 2009, 3809-3816.

http://www.turbineinletcooling.org/resources/papers/CTIC_WetCompression_Shepherd_ASMETurboExpo2011.pdf Jun. 2011.

Luby, P. et al. (2003) "Zero Carbon Power Generation: IGCC as the Premium Option," *Powergen International*, 19 pgs.

MacAdam, S. et al. (2008) "Coal-Based Oxy-Fuel System Evaluation and Combustor Development," *Clean Energy Systems, Inc.* 6 pgs.

Morehead, H. (2007) "Siemens Global Gasification and IGCC Update," *Siemens, Coal-Gen*, Aug. 3, 2007, 17 pgs.

Reeves, S. R. (2001) "Geological Sequestration of $CO_2$ in Deep, Unmineable Coalbeds: An Integrated Research and Commercial-Scale Field Demonstration Project," *SPE 71749*, 10 pgs.

Reeves, S. R. (2003) "Enhanced Coalbed Methane Recovery," *SPE 101466-DL*, 8 pgs.

Richards, G. A. et al. (2001) "Advanced Steam Generators," *National Energy Technology Laboratory*, 7 pgs.

Snarheim, D. et al. (2006) "Control Design for a Gas Turbine Cycle With $CO_2$ Capture Capabilities," *Modeling, Identification and Control*, vol. 00, 10 pgs.

Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. of Science and Technology*, 9 pgs.

vanHemert, P. et al. (2006) "Adsorption of Carbon Dioxide and a Hydrogen-Carbon Dioxide Mixture," *Intn'l Coalbed Methane Symposium* (Tuscaloosa, AL) Paper 0615, 9 pgs.

Zhu, J. et al. (2002) "Recovery of Coalbed Methane by Gas Injection," *SPE 75255*, 15 pgs.

U.S. Appl. No. 13/596,684, filed Aug. 28, 2012, Slobodyanskiy et al.

U.S. Appl. No. 14/066,579, filed Oct. 29, 2013, Huntington et al.

U.S. Appl. No. 14/066,551, filed Oct. 29, 2013, Minto.

U.S. Appl. No. 14/144,511, filed Dec. 30, 2013, Thatcher et al.

U.S. Appl. No. 14/067,559, filed Oct. 30, 2013, Lucas John Stoia et al.

PCT/RU2013/000162, filed Feb. 28, 2013, General Electric Company.

U.S. Appl. No. 14/067,679, filed Oct. 30, 2013, Elizabeth Angelyn Fadde et al.

U.S. Appl. No. 14/067,714, filed Oct. 30, 2013, Carolyn Ashley Antoniono et al.

U.S. Appl. No. 14/067,726, filed Oct. 30, 2013, Carolyn Ashley Antoniono et al.

U.S. Appl. No. 14/067,731, filed Oct. 30, 2013, Carolyn Ashley Antoniono et al.

U.S. Appl. No. 14/067,739, filed Oct. 30, 2013, Carolyn Ashley Antoniono et al.

U.S. Appl. No. 14/067,797, filed Oct. 31, 2013, Anthony Wayne Krull et al.

U.S. Appl. No. 14/066,488, filed Oct. 29, 2013, Pramod K. Biyani et al.

U.S. Appl. No. 14/135,055, filed Dec. 19, 2013, Pramod K. Biyani et al.

U.S. Appl. No. 14/067,844, filed Oct. 30, 2013, John Farrior Woodall et al.

PCT/US13/036020, filed Apr. 10, 2013, General Electric Company/ExxonMobil Upstream Company.

U.S. Appl. No. 14/067,486, filed Oct. 30, 2013, Huntington et al.

U.S. Appl. No. 14/067,537, filed Oct. 30, 2013, Huntington et al.

(56) References Cited

OTHER PUBLICATIONS

U.S. Appl. No. 14/067,552, filed Oct. 30, 2013, Huntington et al.
U.S. Appl. No. 14/067,563, filed Oct. 30, 2013, Huntington et al.
CN First Office Action and English Translation; Application No. CN 201380057201.9; dated Jul. 5, 2016; 34 pages.
EP Communication Pursuant to Article 94(3); Application No. EP 13854183.4; dated Jul. 7, 2016; 5 pages.
Chinese Office Action for CN Application No. 201380057201.9 dated Aug. 15, 2017; 18 pgs.
Japanese Office Action for JP Application No. 2015-540788 dated Aug. 30, 2017; 7 pgs.

* cited by examiner

GAS TURBINE COMBUSTOR CONTROL SYSTEM FOR STOICHIOMETRIC COMBUSTION IN THE PRESENCE OF A DILUENT

CROSS-REFERENCE TO RELATED APPLICATIONS

This application claims priority to and benefit of U.S. Provisional Patent Application No. 61/747,194, entitled "GAS TURBINE COMBUSTOR CONTROL SYSTEM," filed on Dec. 28, 2012, U.S. Provisional Patent Application No. 61/722,118, entitled "SYSTEM AND METHOD FOR DIFFUSION COMBUSTION IN A STOICHIOMETRIC EXHAUST GAS RECIRCULATION GAS TURBINE SYSTEM," filed on Nov. 2, 2012, U.S. Provisional Patent Application No. 61/722,115, entitled "SYSTEM AND METHOD FOR DIFFUSION COMBUSTION WITH FUEL-DILUENT MIXING IN A STOICHIOMETRIC EXHAUST GAS RECIRCULATION GAS TURBINE SYSTEM," filed on Nov. 2, 2012, U.S. Provisional Patent Application No. 61/722,114, entitled "SYSTEM AND METHOD FOR DIFFUSION COMBUSTION WITH OXIDANT-DILUENT MIXING IN A STOICHIOMETRIC EXHAUST GAS RECIRCULATION GAS TURBINE SYSTEM," filed on Nov. 2, 2012, and U.S. Provisional Patent Application No. 61/722,111, entitled "SYSTEM AND METHOD FOR LOAD CONTROL WITH DIFFUSION COMBUSTION IN A STOICHIOMETRIC EXHAUST GAS RECIRCULATION GAS TURBINE SYSTEM," filed on Nov. 2, 2012, all of which are herein incorporated by reference in their entirety for all purposes.

BACKGROUND

The subject matter disclosed herein relates to gas turbine engines.

Gas turbine engines are used in a wide variety of applications, such as power generation, aircraft, and various machinery. Gas turbine engines generally combust a fuel with an oxidant (e.g., air) in a combustor section to generate hot combustion products, which then drive one or more turbine stages of a turbine section. In turn, the turbine section drives one or more compressor stages of a compressor section, thereby compressing oxidant for intake into the combustor section along with the fuel. Again, the fuel and oxidant mix in the combustor section, and then combust to produce the hot combustion products. Generally, the nature of the combustion products, such as the relative levels of particular gases in the combustion products (e.g., nitrogen oxide ($NO_x$), and carbon dioxide ($CO_2$)) can be affected by the ratio of fuel to oxidant used in the combustion process. Unfortunately, certain ratios can lead to excessive levels of oxygen in the combustion products, which can be detrimental to the gas turbine system and downstream components.

BRIEF DESCRIPTION

Certain embodiments commensurate in scope with the originally claimed subject matter are summarized below. These embodiments are not intended to limit the scope of the claimed invention, but rather these embodiments are intended only to provide a brief summary of possible forms of the invention. Indeed, the present disclosure may encompass a variety of forms that may be similar to or different from the embodiments set forth below.

In one embodiment a gas turbine system includes: a controller, having: one or more tangible, non-transitory, machine-readable media collectively storing one or more sets of instructions; and one or more processing devices configured to execute the one or more sets of instructions to: receive fuel composition information related to a fuel used for combustion in a turbine combustor of the gas turbine system; receive oxidant composition information related to an oxidant used for combustion in the turbine combustor of the gas turbine system; receive oxidant flow information related to a flow of the oxidant to the turbine combustor; determine a stoichiometric fuel-to-oxidant ratio ($FOR_{ST}$) based at least on the fuel composition information and the oxidant composition information; generate a control signal for input to a fuel flow control system configured to control a flow of the fuel to the turbine combustor based on the oxidant flow information, a target equivalence ratio, and $FOR_{ST}$ to enable combustion at the target equivalence ratio in the presence of an exhaust gas diluent.

In another embodiment, a gas turbine system includes a turbine combustor configured to combust a fuel and an oxidant at a target equivalence ratio in the presence of an exhaust diluent to produce combustion products; an oxidant path configured to deliver the oxidant to the turbine combustor at an oxidant flow rate; a fuel path configured to deliver the fuel to the turbine combustor at a fuel flow rate, wherein the fuel path comprises a fuel flow control system configured to adjust the fuel flow rate in response to one or more control signals; and a controller communicatively coupled to the flow control system, wherein the controller includes: one or more tangible, non-transitory, machine readable media collectively storing one or more sets of instructions; and one or more processing devices configured to execute the one or more sets of instructions to provide the one or more control signals to the fuel flow control system, wherein the one or more control signals control the fuel flow rate to the combustor to enable combustion in the turbine combustor at the target equivalence ratio, wherein the one or more control signals comprise a feedback component and a feed forward component.

In a further embodiment, one or more non-transitory, machine readable media collectively storing one or more sets of instructions executable by one or more processing devices are provided to: receive fuel composition information related to a fuel used for combustion in a turbine combustor of a gas turbine system; receive oxidant composition information related to an oxidant used for combustion in the turbine combustor of the gas turbine system; receive oxidant flow information related to a flow of the oxidant to the turbine combustor; determine a stoichiometric fuel-to-oxidant ratio ($FOR_{ST}$) based at least on the fuel composition information and the oxidant composition information; determine a reference fuel-to-oxidant ratio ($FOR_{REF}$) using $FOR_{ST}$ and a target equivalence ratio; and generate a control signal for input to a fuel flow control system configured to control a flow of the fuel to the turbine combustor based on the oxidant flow information and $FOR_{REF}$ to enable combustion at the target equivalence ratio between the fuel and the oxidant in the presence of a recirculated exhaust gas within the turbine combustor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
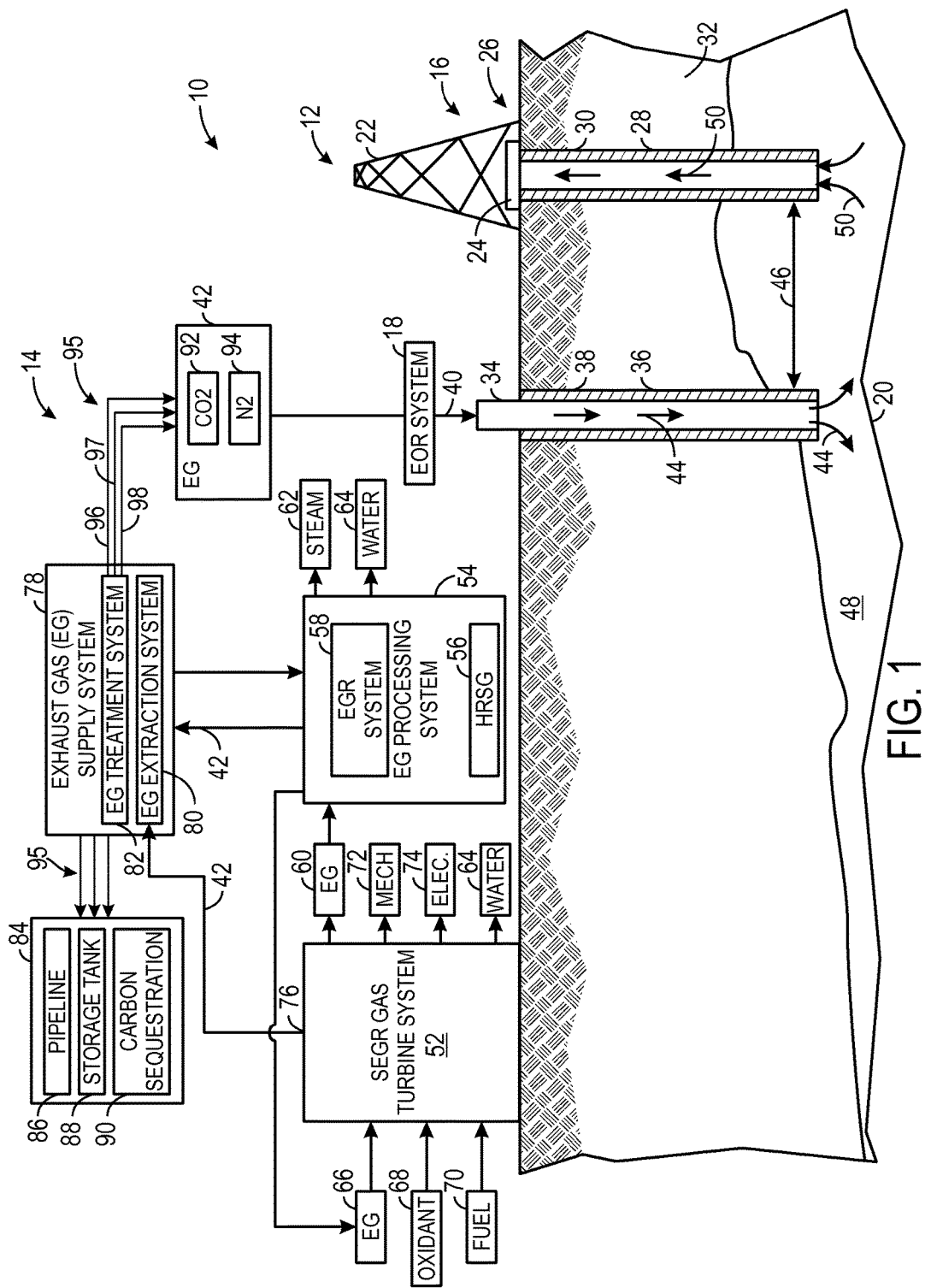
FIG. 1 is a diagram of an embodiment of a system having a turbine-based service system coupled to a hydrocarbon production system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments relate generally to gas turbine systems with exhaust gas recirculation (EGR), and particularly stoichiometric operation of the gas turbine systems using EGR. For example, the gas turbine systems may be configured to recirculate the exhaust gas along an exhaust recirculation path, stoichiometrically combust fuel and oxidant along with at least some of the recirculated exhaust gas, and capture the exhaust gas for use in various target systems. In addition, the stoichiometric ratio at which combustion of the fuel and oxidant is performed may be controlled based on both feed forward and feedback mechanisms. The feed forward mechanism, in certain embodiments, may be based on the composition of the fuel and the oxidant, current flow rates of the fuel and/or oxidant to the gas turbine system, and a desired stoichiometric fuel-to-air ratio. The feedback mechanism, in some embodiments, may be based on a measured composition of the recirculated exhaust gas. A control system may utilize the feed forward mechanism, the feedback mechanism, or a combination thereof, to control the flow of the fuel and/or oxidant to the gas turbine system to achieve a desired composition for the exhaust, such as to achieve higher levels of carbon dioxide ($CO_2$) in the exhaust gas.

In addition to controlling the flow of the fuel and/or oxidant, the recirculation of the exhaust gas along with stoichiometric combustion may help to increase the concentration level of $CO_2$ in the exhaust gas, which can then be post treated to separate and purify the $CO_2$ and nitrogen ($N_2$) for use in various target systems. The gas turbine systems also may employ various exhaust gas processing (e.g., heat recovery, catalyst reactions, etc.) along the exhaust recirculation path, thereby increasing the concentration level of $CO_2$, reducing concentration levels of other emissions (e.g., carbon monoxide, nitrogen oxides, oxygen, and unburnt hydrocarbons), and increasing energy recovery (e.g., with heat recovery units).

FIG. 1 is a diagram of an embodiment of a system 10 having an hydrocarbon production system 12 associated with a turbine-based service system 14. As discussed in further detail below, various embodiments of the turbine-based service system 14 are configured to provide various services, such as electrical power, mechanical power, and fluids (e.g., exhaust gas), to the hydrocarbon production system 12 to facilitate the production or retrieval of oil and/or gas. In the illustrated embodiment, the hydrocarbon production system 12 includes an oil/gas extraction system 16 and an enhanced oil recovery (EOR) system 18, which are coupled to a subterranean reservoir 20 (e.g., an oil, gas, or hydrocarbon reservoir). The oil/gas extraction system 16 includes a variety of surface equipment 22, such as a Christmas tree or production tree 24, coupled to an oil/gas well 26. Furthermore, the well 26 may include one or more tubulars 28 extending through a drilled bore 30 in the earth 32 to the subterranean reservoir 20. The tree 24 includes one or more valves, chokes, isolation sleeves, blowout preventers, and various flow control devices, which regulate pressures and control flows to and from the subterranean reservoir 20. While the tree 24 is generally used to control the flow of the production fluid (e.g., oil or gas) out of the subterranean reservoir 20, the EOR system 18 may increase the production of oil or gas by injecting one or more fluids into the subterranean reservoir 20.

Accordingly, the EOR system 18 may include a fluid injection system 34, which has one or more tubulars 36 extending through a bore 38 in the earth 32 to the subterranean reservoir 20. For example, the EOR system 18 may route one or more fluids 40, such as gas, steam, water, chemicals, or any combination thereof, into the fluid injection system 34. For example, as discussed in further detail below, the EOR system 18 may be coupled to the turbine-based service system 14, such that the system 14 routes an exhaust gas 42 (e.g., substantially or entirely free of oxygen) to the EOR system 18 for use as the injection fluid 40. The fluid injection system 34 routes the fluid 40 (e.g., the exhaust gas 42) through the one or more tubulars 36 into the subterranean reservoir 20, as indicated by arrows 44. The injection fluid 40 enters the subterranean reservoir 20 through the tubular 36 at an offset distance 46 away from the tubular 28 of the oil/gas well 26. Accordingly, the injection fluid 40 displaces the oil/gas 48 disposed in the subterranean reservoir 20, and drives the oil/gas 48 up through the one or more tubulars 28 of the hydrocarbon production system 12, as indicated by arrows 50. As discussed in further detail below, the injection fluid 40 may include the exhaust gas 42 originating from the turbine-based service system 14, which is able to generate the exhaust gas 42 on-site as needed by the hydrocarbon production system 12. In other words, the turbine-based system 14 may simultaneously generate one or more services (e.g., electrical power, mechanical power, steam, water (e.g., desalinated water), and exhaust gas (e.g., substantially free of oxygen)) for use by the hydrocarbon production system 12, thereby reducing or eliminating the reliance on external sources of such services.

In the illustrated embodiment, the turbine-based service system 14 includes a stoichiometric exhaust gas recirculation (SEGR) gas turbine system 52 and an exhaust gas (EG) processing system 54. The gas turbine system 52 may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of a fuel and oxidant, thereby resulting in substantially stoichiometric combustion. In particular, stoichiometric combustion generally involves consuming substantially all of the fuel and oxidant in the combustion reaction, such that the products of combustion are substantially or entirely free of unburnt fuel and oxidant. One measure of stoichiometric combustion is the equivalence ratio, or phi ($\Phi$), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the turbine-based service system 14 may result in products of combustion or exhaust gas (e.g., 42) with substantially no unburnt fuel or oxidant remaining. For example, the exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_x$), carbon monoxide (CO), sulfur oxides (e.g., $SO_x$), hydrogen, and other products of incomplete combustion. By further example, the exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_x$), carbon monoxide (CO), sulfur oxides (e.g., $SO_x$), hydrogen, and other products of incomplete combustion. However, the disclosed embodiments also may produce other ranges of residual fuel, oxidant, and other emissions levels in the exhaust gas 42. As used herein, the terms emissions, emissions levels, and emissions targets may refer to concentration levels of certain products of combustion (e.g., $NO_x$, CO, $SO_x$, $O_2$, $N_2$, $H_2$, HCs, etc.), which may be present in recirculated gas streams, vented gas streams (e.g., exhausted into the atmosphere), and gas streams used in various target systems (e.g., the hydrocarbon production system 12).

Although the SEGR gas turbine system 52 and the EG processing system 54 may include a variety of components in different embodiments, the illustrated EG processing system 54 includes a heat recovery steam generator (HRSG) 56 and an exhaust gas recirculation (EGR) system 58, which receive and process an exhaust gas 60 originating from the SEGR gas turbine system 52. The HRSG 56 may include one or more heat exchangers, condensers, and various heat recovery equipment, which collectively function to transfer heat from the exhaust gas 60 to a stream of water, thereby generating steam 62. The steam 62 may be used in one or more steam turbines, the EOR system 18, or any other portion of the hydrocarbon production system 12. For example, the HRSG 56 may generate low pressure, medium pressure, and/or high pressure steam 62, which may be selectively applied to low, medium, and high pressure steam turbine stages, or different applications of the EOR system 18. In addition to the steam 62, a treated water 64, such as a desalinated water, may be generated by the HRSG 56, the EGR system 58, and/or another portion of the EG processing system 54 or the SEGR gas turbine system 52. The treated water 64 (e.g., desalinated water) may be particularly useful in areas with water shortages, such as inland or desert regions. The treated water 64 may be generated, at least in part, due to the large volume of air driving combustion of fuel within the SEGR gas turbine system 52. While the on-site generation of steam 62 and water 64 may be beneficial in many applications (including the hydrocarbon production system 12), the on-site generation of exhaust gas 42, 60 may be particularly beneficial for the EOR system 18, due to its low oxygen content, high pressure, and heat derived from the SEGR gas turbine system 52. Accordingly, the HRSG 56, the EGR system 58, and/or another portion of the EG processing system 54 may output or recirculate an exhaust gas 66 into the SEGR gas turbine system 52, while also routing the exhaust gas 42 to the EOR system 18 for use with the hydrocarbon production system 12. Likewise, the exhaust gas 42 may be extracted directly from the SEGR gas turbine system 52 (i.e., without passing through the EG processing system 54) for use in the EOR system 18 of the hydrocarbon production system 12.

The exhaust gas recirculation is handled by the EGR system 58 of the EG processing system 54. For example, the EGR system 58 includes one or more conduits, valves, blowers, exhaust gas treatment systems (e.g., filters, particulate removal units, gas separation units, gas purification units, heat exchangers, heat recovery units, moisture removal units, catalyst units, chemical injection units, or any combination thereof), and controls to recirculate the exhaust gas along an exhaust gas circulation path from an output (e.g., discharged exhaust gas 60) to an input (e.g., intake exhaust gas 66) of the SEGR gas turbine system 52. In the illustrated embodiment, the SEGR gas turbine system 52 intakes the exhaust gas 66 into a compressor section having one or more compressors, thereby compressing the exhaust gas 66 for use in a combustor section along with an intake of an oxidant 68 and one or more fuels 70. The oxidant 68 may include ambient air, pure oxygen, oxygen-enriched air, oxygen-reduced air, oxygen-nitrogen mixtures, or any suitable oxidant that facilitates combustion of the fuel 70. The fuel 70 may include one or more gas fuels, liquid fuels, or any combination thereof. For example, the fuel 70 may include natural gas, liquefied natural gas (LNG), syngas, methane, ethane, propane, butane, naphtha, kerosene, diesel fuel, ethanol, methanol, biofuel, or any combination thereof.

The SEGR gas turbine system 52 mixes and combusts the exhaust gas 66, the oxidant 68, and the fuel 70 in the combustor section, thereby generating hot combustion gases or exhaust gas 60 to drive one or more turbine stages in a turbine section. In certain embodiments, each combustor in the combustor section includes one or more premix fuel nozzles, one or more diffusion fuel nozzles, or any combination thereof. For example, each premix fuel nozzle may be configured to mix the oxidant 68 and the fuel 70 internally within the fuel nozzle and/or partially upstream of the fuel nozzle, thereby injecting an oxidant-fuel mixture from the fuel nozzle into the combustion zone for a premixed combustion (e.g., a premixed flame). By further example, each diffusion fuel nozzle may be configured to isolate the flows of oxidant 68 and fuel 70 within the fuel nozzle, thereby separately injecting the oxidant 68 and the fuel 70 from the fuel nozzle into the combustion zone for diffusion combustion (e.g., a diffusion flame). In particular, the diffusion combustion provided by the diffusion fuel nozzles delays mixing of the oxidant 68 and the fuel 70 until the point of initial combustion, i.e., the flame region. In embodiments employing the diffusion fuel nozzles, the diffusion flame may provide increased flame stability, because the diffusion flame generally forms at the point of stoichiometry between the separate streams of oxidant 68 and fuel 70 (i.e., as the oxidant 68 and fuel 70 are mixing). In certain embodiments, one or more diluents (e.g., the exhaust gas 60, steam, nitrogen, or another inert gas) may be pre-mixed with the oxidant 68, the fuel 70, or both, in either the diffusion fuel nozzle or the premix fuel nozzle. In addition, one or more diluents (e.g., the exhaust gas 60, steam, nitrogen, or another inert gas) may be injected into the combustor at or downstream from the point of combustion within each combustor. The use of these diluents may help temper the flame (e.g., premix flame or diffusion flame), thereby helping to reduce $NO_X$ emissions, such as nitrogen monoxide (NO) and nitrogen dioxide ($NO_2$). Regardless of the type of flame, the combustion produces hot combustion gases or exhaust gas 60 to drive one or more turbine stages. As each turbine stage is driven by the exhaust gas 60, the SEGR gas turbine system 52 generates a mechanical power 72 and/or an electrical power 74 (e.g., via an electrical generator). The system 52 also outputs the exhaust gas 60, and may further output water 64. Again, the water 64 may be a treated water, such as a desalinated water, which may be useful in a variety of applications on-site or off-site.

Exhaust extraction is also provided by the SEGR gas turbine system 52 using one or more extraction points 76. For example, the illustrated embodiment includes an exhaust gas (EG) supply system 78 having an exhaust gas (EG) extraction system 80 and an exhaust gas (EG) treatment system 82, which receive exhaust gas 42 from the extraction points 76, treat the exhaust gas 42, and then supply or distribute the exhaust gas 42 to various target systems. The target systems may include the EOR system 18 and/or other systems, such as a pipeline 86, a storage tank 88, or a carbon sequestration system 90. The EG extraction system 80 may include one or more conduits, valves, controls, and flow separations, which facilitate isolation of the exhaust gas 42 from the oxidant 68, the fuel 70, and other contaminants, while also controlling the temperature, pressure, and flow rate of the extracted exhaust gas 42. The EG treatment system 82 may include one or more heat exchangers (e.g., heat recovery units such as heat recovery steam generators, condensers, coolers, or heaters), catalyst systems (e.g., oxidation catalyst systems), particulate and/or water removal systems (e.g., gas dehydration units, inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, exhaust gas compressors, any combination thereof. These subsystems of the EG treatment system 82 enable control of the temperature, pressure, flow rate, moisture content (e.g., amount of water removal), particulate content (e.g., amount of particulate removal), and gas composition (e.g., percentage of $CO_2$, $N_2$, etc.).

The extracted exhaust gas 42 is treated by one or more subsystems of the EG treatment system 82, depending on the target system. For example, the EG treatment system 82 may direct all or part of the exhaust gas 42 through a carbon capture system, a gas separation system, a gas purification system, and/or a solvent based treatment system, which is controlled to separate and purify a carbonaceous gas (e.g., carbon dioxide) 92 and/or nitrogen ($N_2$) 94 for use in the various target systems. For example, embodiments of the EG treatment system 82 may perform gas separation and purification to produce a plurality of different streams 95 of exhaust gas 42, such as a first stream 96, a second stream 97, and a third stream 98. The first stream 96 may have a first composition that is rich in carbon dioxide and/or lean in nitrogen (e.g., a $CO_2$ rich, $N_2$ lean stream). The second stream 97 may have a second composition that has intermediate concentration levels of carbon dioxide and/or nitrogen (e.g., intermediate concentration $CO_2$, $N_2$ stream). The third stream 98 may have a third composition that is lean in carbon dioxide and/or rich in nitrogen (e.g., a $CO_2$ lean, $N_2$ rich stream). Each stream 95 (e.g., 96, 97, and 98) may include a gas dehydration unit, a filter, a gas compressor, or any combination thereof, to facilitate delivery of the stream 95 to a target system. In certain embodiments, the $CO_2$ rich, $N_2$ lean stream 96 may have a $CO_2$ purity or concentration level of greater than approximately 70, 75, 80, 85, 90, 95, 96, 97, 98, or 99 percent by volume, and a $N_2$ purity or concentration level of less than approximately 1, 2, 3, 4, 5, 10, 15, 20, 25, or percent by volume. In contrast, the $CO_2$ lean, $N_2$ rich stream 98 may have a $CO_2$ purity or concentration level of less than approximately 1, 2, 3, 4, 5, 10, 15, 20, 25, or percent by volume, and a $N_2$ purity or concentration level of greater than approximately 70, 75, 80, 85, 90, 95, 96, 97, 98, or 99 percent by volume. The intermediate concentration $CO_2$, $N_2$ stream 97 may have a $CO_2$ purity or concentration level and/or a $N_2$ purity or concentration level of between approximately 30 to 70, 35 to 65, 40 to 60, or 45 to 55 percent by volume. Although the foregoing ranges are merely non-limiting examples, the $CO_2$ rich, $N_2$ lean stream 96 and the $CO_2$ lean, $N_2$ rich stream 98 may be particularly well suited for use with the EOR system 18 and the other systems 84. However, any of these rich, lean, or intermediate concentration $CO_2$ streams 95 may be used, alone or in various combinations, with the EOR system 18 and the other systems 84. For example, the EOR system 18 and the other systems 84 (e.g., the pipeline 86, storage tank 88, and the carbon sequestration system 90) each may receive one or more $CO_2$ rich, $N_2$ lean streams 96, one or more $CO_2$ lean, $N_2$ rich streams 98, one or more intermediate concentration $CO_2$, $N_2$ streams 97, and one or more untreated exhaust gas 42 streams (i.e., bypassing the EG treatment system 82).

The EG extraction system 80 extracts the exhaust gas 42 at one or more extraction points 76 along the compressor section, the combustor section, and/or the turbine section, such that the exhaust gas 42 may be used in the EOR system 18 and other systems 84 at suitable temperatures and pressures. The EG extraction system 80 and/or the EG treatment system 82 also may circulate fluid flows (e.g., exhaust gas 42) to and from the EG processing system 54. For example, a portion of the exhaust gas 42 passing through the EG processing system 54 may be extracted by the EG extraction system 80 for use in the EOR system 18 and the other systems 84. In certain embodiments, the EG supply system 78 and the EG processing system 54 may be independent or integral with one another, and thus may use independent or common subsystems. For example, the EG treatment system 82 may be used by both the EG supply system 78 and the EG processing system 54. Exhaust gas 42 extracted from the EG processing system 54 may undergo multiple stages of gas treatment, such as one or more stages of gas treatment in the EG processing system 54 followed by one or more additional stages of gas treatment in the EG treatment system 82.

At each extraction point 76, the extracted exhaust gas 42 may be substantially free of oxidant 68 and fuel 70 (e.g., unburnt fuel or hydrocarbons) due to substantially stoichiometric combustion and/or gas treatment in the EG processing system 54. Furthermore, depending on the target system, the extracted exhaust gas 42 may undergo further treatment in the EG treatment system 82 of the EG supply system 78, thereby further reducing any residual oxidant 68, fuel 70, or other undesirable products of combustion. For example, either before or after treatment in the EG treatment system 82, the extracted exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, either before or after treatment in the EG treatment system 82, the extracted exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. Thus, the exhaust gas 42 is particularly well suited for use with the EOR system 18.

The EGR operation of the turbine system 52 specifically enables the exhaust extraction at a multitude of locations 76. For example, the compressor section of the system 52 may be used to compress the exhaust gas 66 without any oxidant 68 (i.e., only compression of the exhaust gas 66), such that a substantially oxygen-free exhaust gas 42 may be extracted from the compressor section and/or the combustor section prior to entry of the oxidant 68 and the fuel 70. The extraction points 76 may be located at interstage ports between adjacent compressor stages, at ports along the compressor discharge casing, at ports along each combustor in the combustor section, or any combination thereof. In certain embodiments, the exhaust gas 66 may not mix with the oxidant 68 and fuel 70 until it reaches the head end portion and/or fuel nozzles of each combustor in the combustor section. Furthermore, one or more flow separators (e.g., walls, dividers, baffles, or the like) may be used to isolate the oxidant 68 and the fuel 70 from the extraction points 76. With these flow separators, the extraction points 76 may be disposed directly along a wall of each combustor in the combustor section.

Once the exhaust gas 66, oxidant 68, and fuel 70 flow through the head end portion (e.g., through fuel nozzles) into the combustion portion (e.g., combustion chamber) of each combustor, the SEGR gas turbine system 52 is controlled to provide a substantially stoichiometric combustion of the exhaust gas 66, oxidant 68, and fuel 70. For example, the system 52 may maintain an equivalence ratio of approximately 0.95 to approximately 1.05. As a result, the products of combustion of the mixture of exhaust gas 66, oxidant 68, and fuel 70 in each combustor is substantially free of oxygen and unburnt fuel. Thus, the products of combustion (or exhaust gas) may be extracted from the turbine section of the SEGR gas turbine system 52 for use as the exhaust gas 42 routed to the EOR system 18. Along the turbine section, the extraction points 76 may be located at any turbine stage, such as interstage ports between adjacent turbine stages. Thus, using any of the foregoing extraction points 76, the turbine-based service system 14 may generate, extract, and deliver the exhaust gas 42 to the hydrocarbon production system 12 (e.g., the EOR system 18) for use in the production of oil/gas 48 from the subterranean reservoir 20.

Figure 2:
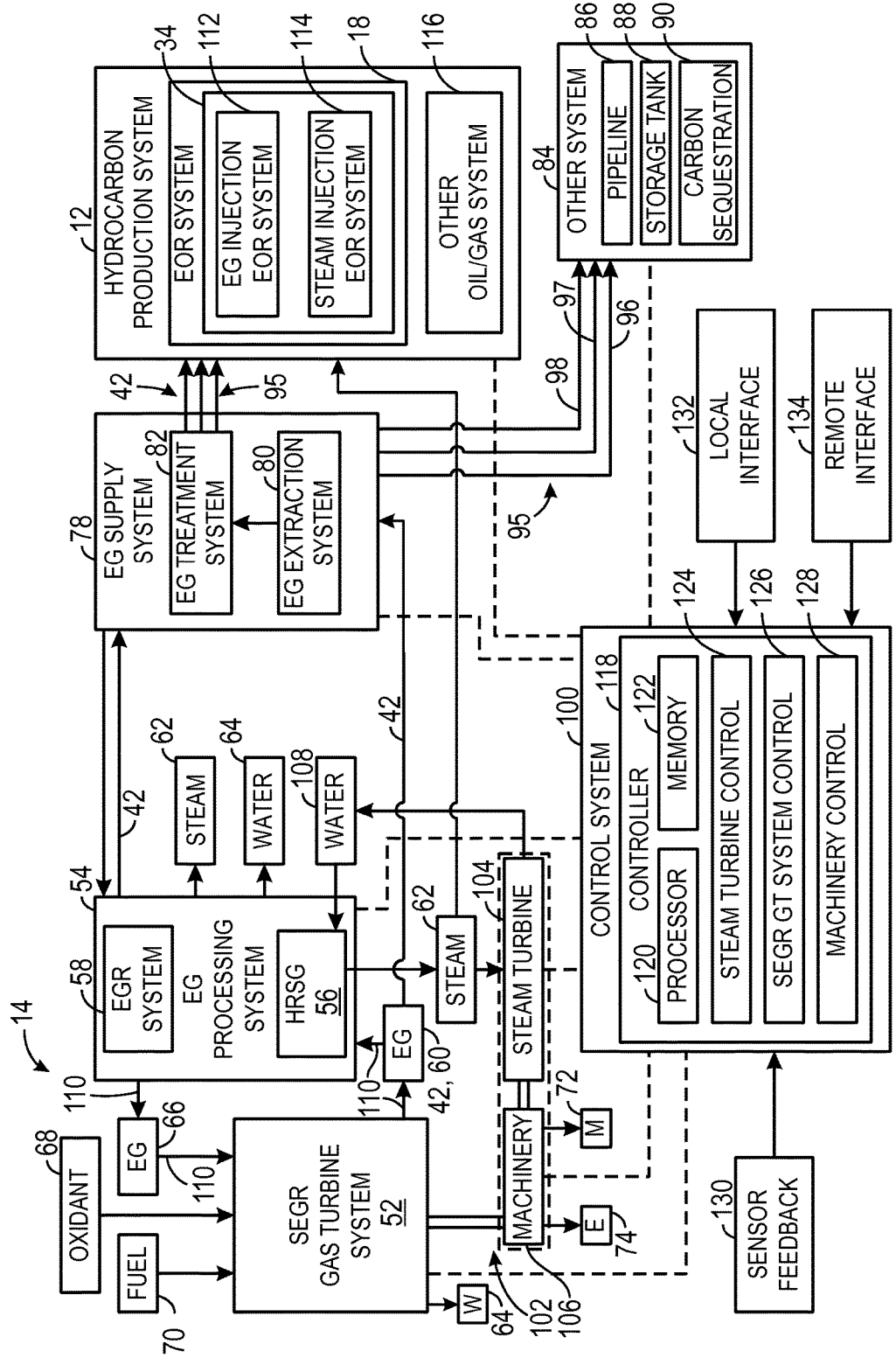
FIG. 2 is a diagram of an embodiment of the system of FIG. 1, further illustrating a control system and a combined cycle system.

FIG. 2 is a diagram of an embodiment of the system 10 of FIG. 1, illustrating a control system 100 coupled to the turbine-based service system 14 and the hydrocarbon production system 12. In the illustrated embodiment, the turbine-based service system 14 includes a combined cycle system 102, which includes the SEGR gas turbine system 52 as a topping cycle, a steam turbine 104 as a bottoming cycle, and the HRSG 56 to recover heat from the exhaust gas 60 to generate the steam 62 for driving the steam turbine 104. Again, the SEGR gas turbine system 52 receives, mixes, and stoichiometrically combusts the exhaust gas 66, the oxidant 68, and the fuel 70 (e.g., premix and/or diffusion flames), thereby producing the exhaust gas 60, the mechanical power 72, the electrical power 74, and/or the water 64. For example, the SEGR gas turbine system 52 may drive one or more loads or machinery 106, such as an electrical generator, an oxidant compressor (e.g., a main air compressor), a gear box, a pump, equipment of the hydrocarbon production system 12, or any combination thereof. In some embodiments, the machinery 106 may include other drives, such as electrical motors or steam turbines (e.g., the steam turbine 104), in tandem with the SEGR gas turbine system 52. Accordingly, an output of the machinery 106 driven by the SEGR gas turbines system 52 (and any additional drives) may include the mechanical power 72 and the electrical power 74. The mechanical power 72 and/or the electrical power 74 may be used on-site for powering the hydrocarbon production system 12, the electrical power 74 may be distributed to the power grid, or any combination thereof. The output of the machinery 106 also may include a compressed fluid, such as a compressed oxidant 68 (e.g., air or oxygen), for intake into the combustion section of the SEGR gas turbine system 52. Each of these outputs (e.g., the exhaust gas 60, the mechanical power 72, the electrical power 74, and/or the water 64) may be considered a service of the turbine-based service system 14.

The SEGR gas turbine system 52 produces the exhaust gas 42, 60, which may be substantially free of oxygen, and routes this exhaust gas 42, 60 to the EG processing system 54 and/or the EG supply system 78. The EG supply system 78 may treat and delivery the exhaust gas 42 (e.g., streams 95) to the hydrocarbon production system 12 and/or the other systems 84. As discussed above, the EG processing system 54 may include the HRSG 56 and the EGR system 58. The HRSG 56 may include one or more heat exchangers, condensers, and various heat recovery equipment, which may be used to recover or transfer heat from the exhaust gas 60 to water 108 to generate the steam 62 for driving the steam turbine 104. Similar to the SEGR gas turbine system 52, the steam turbine 104 may drive one or more loads or machinery 106, thereby generating the mechanical power 72 and the electrical power 74. In the illustrated embodiment, the SEGR gas turbine system 52 and the steam turbine 104 are arranged in tandem to drive the same machinery 106. However, in other embodiments, the SEGR gas turbine system 52 and the steam turbine 104 may separately drive different machinery 106 to independently generate mechanical power 72 and/or electrical power 74. As the steam turbine 104 is driven by the steam 62 from the HRSG 56, the steam 62 gradually decreases in temperature and pressure. Accordingly, the steam turbine 104 recirculates the used steam 62 and/or water 108 back into the HRSG 56 for additional steam generation via heat recovery from the exhaust gas 60. In addition to steam generation, the HRSG 56, the EGR system 58, and/or another portion of the EG processing system 54 may produce the water 64, the exhaust gas 42 for use with the hydrocarbon production system 12, and the exhaust gas 66 for use as an input into the SEGR gas turbine system 52. For example, the water 64 may be a treated water 64, such as a desalinated water for use in other applications. The desalinated water may be particularly useful in regions of low water availability. Regarding the exhaust gas 60, embodiments of the EG processing system 54 may be configured to recirculate the exhaust gas 60 through the EGR system 58 with or without passing the exhaust gas 60 through the HRSG 56.

In the illustrated embodiment, the SEGR gas turbine system 52 has an exhaust recirculation path 110, which extends from an exhaust outlet to an exhaust inlet of the system 52. Along the path 110, the exhaust gas 60 passes through the EG processing system 54, which includes the HRSG 56 and the EGR system 58 in the illustrated embodiment. The EGR system 58 may include one or more conduits, valves, blowers, gas treatment systems (e.g., filters, particulate removal units, gas separation units, gas purification units, heat exchangers, heat recovery units such as heat recovery steam generators, moisture removal units, catalyst units, chemical injection units, or any combination thereof) in series and/or parallel arrangements along the path 110. In other words, the EGR system 58 may include any flow control components, pressure control components, temperature control components, moisture control components, and gas composition control components along the exhaust recirculation path 110 between the exhaust outlet and the exhaust inlet of the system 52. Accordingly, in embodiments with the HRSG 56 along the path 110, the HRSG 56 may be considered a component of the EGR system 58. However, in certain embodiments, the HRSG 56 may be disposed along an exhaust path independent from the exhaust recirculation path 110. Regardless of whether the HRSG 56 is along a separate path or a common path with the EGR system 58, the HRSG 56 and the EGR system 58 intake the exhaust gas 60 and output either the recirculated exhaust gas 66, the exhaust gas 42 for use with the EG supply system 78 (e.g., for the hydrocarbon production system 12 and/or other systems 84), or another output of exhaust gas. Again, the SEGR gas turbine system 52 intakes, mixes, and stoichiometrically combusts the exhaust gas 66, the oxidant 68, and the fuel 70 (e.g., premixed and/or diffusion flames) to produce a substantially oxygen-free and fuel-free exhaust gas 60 for distribution to the EG processing system 54, the hydrocarbon production system 12, or other systems 84.

As noted above with reference to FIG. 1, the hydrocarbon production system 12 may include a variety of equipment to facilitate the recovery or production of oil/gas 48 from a subterranean reservoir 20 through an oil/gas well 26. For example, the hydrocarbon production system 12 may include the EOR system 18 having the fluid injection system 34. In the illustrated embodiment, the fluid injection system 34 includes an exhaust gas injection EOR system 112 and a steam injection EOR system 114. Although the fluid injection system 34 may receive fluids from a variety of sources, the illustrated embodiment may receive the exhaust gas 42 and the steam 62 from the turbine-based service system 14. The exhaust gas 42 and/or the steam 62 produced by the turbine-based service system 14 also may be routed to the hydrocarbon production system 12 for use in other oil/gas systems 116.

The quantity, quality, and flow of the exhaust gas 42 and/or the steam 62 may be controlled by the control system 100. The control system 100 may be dedicated entirely to the turbine-based service system 14, or the control system 100 may optionally also provide control (or at least some data to facilitate control) for the hydrocarbon production system 12 and/or other systems 84. In the illustrated embodiment, the control system 100 includes a controller 118 having a processor 120, a memory 122, a steam turbine control 124, a SEGR gas turbine system control 126, and a machinery control 128. The processor 120 may include a single processor or two or more redundant processors, such as triple redundant processors for control of the turbine-based service system 14. The memory 122 may include volatile and/or non-volatile memory. For example, the memory 122 may include one or more hard drives, flash memory, read-only memory, random access memory, or any combination thereof. The controls 124, 126, and 128 may include software and/or hardware controls. For example, the controls 124, 126, and 128 may include various instructions or code stored on the memory 122 and executable by the processor 120. The control 124 is configured to control operation of the steam turbine 104, the SEGR gas turbine system control 126 is configured to control the system 52, and the machinery control 128 is configured to control the machinery 106. Thus, the controller 118 (e.g., controls 124, 126, and 128) may be configured to coordinate various sub-systems of the turbine-based service system 14 to provide a suitable stream of the exhaust gas 42 to the hydrocarbon production system 12.

In certain embodiments of the control system 100, each element (e.g., system, subsystem, and component) illustrated in the drawings or described herein includes (e.g., directly within, upstream, or downstream of such element) one or more industrial control features, such as sensors and control devices, which are communicatively coupled with one another over an industrial control network along with the controller 118. For example, the control devices associated with each element may include a dedicated device controller (e.g., including a processor, memory, and control instructions), one or more actuators, valves, switches, and industrial control equipment, which enable control based on sensor feedback 130, control signals from the controller 118, control signals from a user, or any combination thereof. Thus, any of the control functionality described herein may be implemented with control instructions stored and/or executable by the controller 118, dedicated device controllers associated with each element, or a combination thereof.

In order to facilitate such control functionality, the control system 100 includes one or more sensors distributed throughout the system 10 to obtain the sensor feedback 130 for use in execution of the various controls, e.g., the controls 124, 126, and 128. For example, the sensor feedback 130 may be obtained from sensors distributed throughout the SEGR gas turbine system 52, the machinery 106, the EG processing system 54, the steam turbine 104, the hydrocarbon production system 12, or any other components throughout the turbine-based service system 14 or the hydrocarbon production system 12. For example, the sensor feedback 130 may include temperature feedback, pressure feedback, flow rate feedback, flame temperature feedback, combustion dynamics feedback, intake oxidant composition feedback, intake fuel composition feedback, exhaust composition feedback, the output level of mechanical power 72, the output level of electrical power 74, the output quantity of the exhaust gas 42, 60, the output quantity or quality of the water 64, or any combination thereof. For example, the sensor feedback 130 may include a composition of the exhaust gas 42, 60 to facilitate stoichiometric combustion in the SEGR gas turbine system 52. For example, the sensor feedback 130 may include feedback from one or more intake oxidant sensors along an oxidant supply path of the oxidant 68, one or more intake fuel sensors along a fuel supply path of the fuel 70, and one or more exhaust emissions sensors disposed along the exhaust recirculation path 110 and/or within the SEGR gas turbine system 52. The intake oxidant sensors, intake fuel sensors, and exhaust emissions sensors may include temperature sensors, pressure sensors, flow rate sensors, and composition sensors. The emissions sensors may includes sensors for nitrogen oxides (e.g., $NO_X$ sensors), carbon oxides (e.g., CO sensors and $CO_2$ sensors), sulfur oxides (e.g., $SO_X$ sensors), hydrogen (e.g., $H_2$ sensors), oxygen (e.g., $O_2$ sensors), unburnt hydrocarbons (e.g., HC sensors), or other products of incomplete combustion, or any combination thereof.

Using this feedback 130, the control system 100 may adjust (e.g., increase, decrease, or maintain) the intake flow of exhaust gas 66, oxidant 68, and/or fuel 70 into the SEGR gas turbine system 52 (among other operational parameters) to maintain the equivalence ratio within a suitable range, e.g., between approximately 0.95 to approximately 1.05, between approximately 0.95 to approximately 1.0, between approximately 1.0 to approximately 1.05, or substantially at 1.0. For example, the control system 100 may analyze the feedback 130 to monitor the exhaust emissions (e.g., concentration levels of nitrogen oxides, carbon oxides such as CO and $CO_2$, sulfur oxides, hydrogen, oxygen, unburnt hydrocarbons, and other products of incomplete combustion) and/or determine the equivalence ratio, and then control one or more components to adjust the exhaust emissions (e.g., concentration levels in the exhaust gas 42) and/or the equivalence ratio. The controlled components may include any of the components illustrated and described with reference to the drawings, including but not limited to, valves along the supply paths for the oxidant 68, the fuel 70, and the exhaust gas 66; an oxidant compressor, a fuel pump, or any components in the EG processing system 54; any components of the SEGR gas turbine system 52, or any combination thereof. The controlled components may adjust (e.g., increase, decrease, or maintain) the flow rates, temperatures, pressures, or percentages (e.g., equivalence ratio) of the oxidant 68, the fuel 70, and the exhaust gas 66 that combust within the SEGR gas turbine system 52. The controlled components also may include one or more gas treatment systems, such as catalyst units (e.g., oxidation catalyst units), supplies for the catalyst units (e.g., oxidation fuel, heat, electricity, etc.), gas purification and/or separation units (e.g., solvent based separators, absorbers, flash tanks, etc.), and filtration units. The gas treatment systems may help reduce various exhaust emissions along the exhaust recirculation path 110, a vent path (e.g., exhausted into the atmosphere), or an extraction path to the EG supply system 78.

In certain embodiments, the control system 100 may analyze the feedback 130 and control one or more components to maintain or reduce emissions levels (e.g., concentration levels in the exhaust gas 42, 60, 95) to a target range, such as less than approximately 10, 20, 30, 40, 50, 100, 200, 300, 400, 500, 1000, 2000, 3000, 4000, 5000, or 10000 parts per million by volume (ppmv). These target ranges may be the same or different for each of the exhaust emissions, e.g., concentration levels of nitrogen oxides, carbon monoxide, sulfur oxides, hydrogen, oxygen, unburnt hydrocarbons, and other products of incomplete combustion. For example, depending on the equivalence ratio, the control system 100 may selectively control exhaust emissions (e.g., concentration levels) of oxidant (e.g., oxygen) within a target range of less than approximately 10, 20, 30, 40, 50, 60, 70, 80, 90, 100, 250, 500, 750, or 1000 ppmv; carbon monoxide (CO) within a target range of less than approximately 20, 50, 100, 200, 500, 1000, 2500, or 5000 ppmv; and nitrogen oxides ($NO_X$) within a target range of less than approximately 50, 100, 200, 300, 400, or 500 ppmv. In certain embodiments operating with a substantially stoichiometric equivalence ratio, the control system 100 may selectively control exhaust emissions (e.g., concentration levels) of oxidant (e.g., oxygen) within a target range of less than approximately 10, 20, 30, 40, 50, 60, 70, 80, 90, or 100 ppmv; and carbon monoxide (CO) within a target range of less than approximately 500, 1000, 2000, 3000, 4000, or 5000 ppmv. In certain embodiments operating with a fuel-lean equivalence ratio (e.g., between approximately 0.95 to 1.0), the control system 100 may selectively control exhaust emissions (e.g., concentration levels) of oxidant (e.g., oxygen) within a target range of less than approximately 500, 600, 700, 800, 900, 1000, 1100, 1200, 1300, 1400, or 1500 ppmv; carbon monoxide (CO) within a target range of less than approximately 10, 20, 30, 40, 50, 60, 70, 80, 90, 100, 150, or 200 ppmv; and nitrogen oxides (e.g., $NO_X$) within a target range of less than approximately 50, 100, 150, 200, 250, 300, 350, or 400 ppmv. The foregoing target ranges are merely examples, and are not intended to limit the scope of the disclosed embodiments.

The control system 100 also may be coupled to a local interface 132 and a remote interface 134. For example, the local interface 132 may include a computer workstation disposed on-site at the turbine-based service system 14 and/or the hydrocarbon production system 12. In contrast, the remote interface 134 may include a computer workstation disposed off-site from the turbine-based service system 14 and the hydrocarbon production system 12, such as through an internet connection. These interfaces 132 and 134 facilitate monitoring and control of the turbine-based service system 14, such as through one or more graphical displays of sensor feedback 130, operational parameters, and so forth.

Again, as noted above, the controller 118 includes a variety of controls 124, 126, and 128 to facilitate control of the turbine-based service system 14. The steam turbine control 124 may receive the sensor feedback 130 and output control commands to facilitate operation of the steam turbine 104. For example, the steam turbine control 124 may receive the sensor feedback 130 from the HRSG 56, the machinery 106, temperature and pressure sensors along a path of the steam 62, temperature and pressure sensors along a path of the water 108, and various sensors indicative of the mechanical power 72 and the electrical power 74. Likewise, the SEGR gas turbine system control 126 may receive sensor feedback 130 from one or more sensors disposed along the SEGR gas turbine system 52, the machinery 106, the EG processing system 54, or any combination thereof. For example, the sensor feedback 130 may be obtained from temperature sensors, pressure sensors, clearance sensors, vibration sensors, flame sensors, fuel composition sensors, exhaust gas composition sensors, or any combination thereof, disposed within or external to the SEGR gas turbine system 52. Finally, the machinery control 128 may receive sensor feedback 130 from various sensors associated with the mechanical power 72 and the electrical power 74, as well as sensors disposed within the machinery 106. Each of these controls 124, 126, and 128 uses the sensor feedback 130 to improve operation of the turbine-based service system 14.

In the illustrated embodiment, the SEGR gas turbine system control 126 may execute instructions to control the quantity and quality of the exhaust gas 42, 60, 95 in the EG processing system 54, the EG supply system 78, the hydrocarbon production system 12, and/or the other systems 84. For example, the SEGR gas turbine system control 126 may maintain a level of oxidant (e.g., oxygen) and/or unburnt fuel in the exhaust gas 60 below a threshold suitable for use with the exhaust gas injection EOR system 112. In certain embodiments, the threshold levels may be less than 1, 2, 3, 4, or 5 percent of oxidant (e.g., oxygen) and/or unburnt fuel by volume of the exhaust gas 42, 60; or the threshold levels of oxidant (e.g., oxygen) and/or unburnt fuel (and other exhaust emissions) may be less than approximately 10, 20, 30, 40, 50, 60, 70, 80, 90, 100, 200, 300, 400, 500, 1000, 2000, 3000, 4000, or 5000 parts per million by volume (ppmv) in the exhaust gas 42, 60. By further example, in order to achieve these low levels of oxidant (e.g., oxygen) and/or unburnt fuel, the SEGR gas turbine system control 126 may maintain an equivalence ratio for combustion in the SEGR gas turbine system 52 between approximately 0.95 and approximately 1.05. The SEGR gas turbine system control 126 also may control the EG extraction system 80 and the EG treatment system 82 to maintain the temperature, pressure, flow rate, and gas composition of the exhaust gas 42, 60, 95 within suitable ranges for the exhaust gas injection EOR system 112, the pipeline 86, the storage tank 88, and the carbon sequestration system 90. As discussed above, the EG treatment system 82 may be controlled to purify and/or separate the exhaust gas 42 into one or more gas streams 95, such as the $CO_2$ rich, $N_2$ lean stream 96, the intermediate concentration $CO_2$, $N_2$ stream 97, and the $CO_2$ lean, $N_2$ rich stream 98. In addition to controls for the exhaust gas 42, 60, and 95, the controls 124, 126, and 128 may execute one or more instructions to maintain the mechanical power 72 within a suitable power range, or maintain the electrical power 74 within a suitable frequency and power range.

Figure 3:
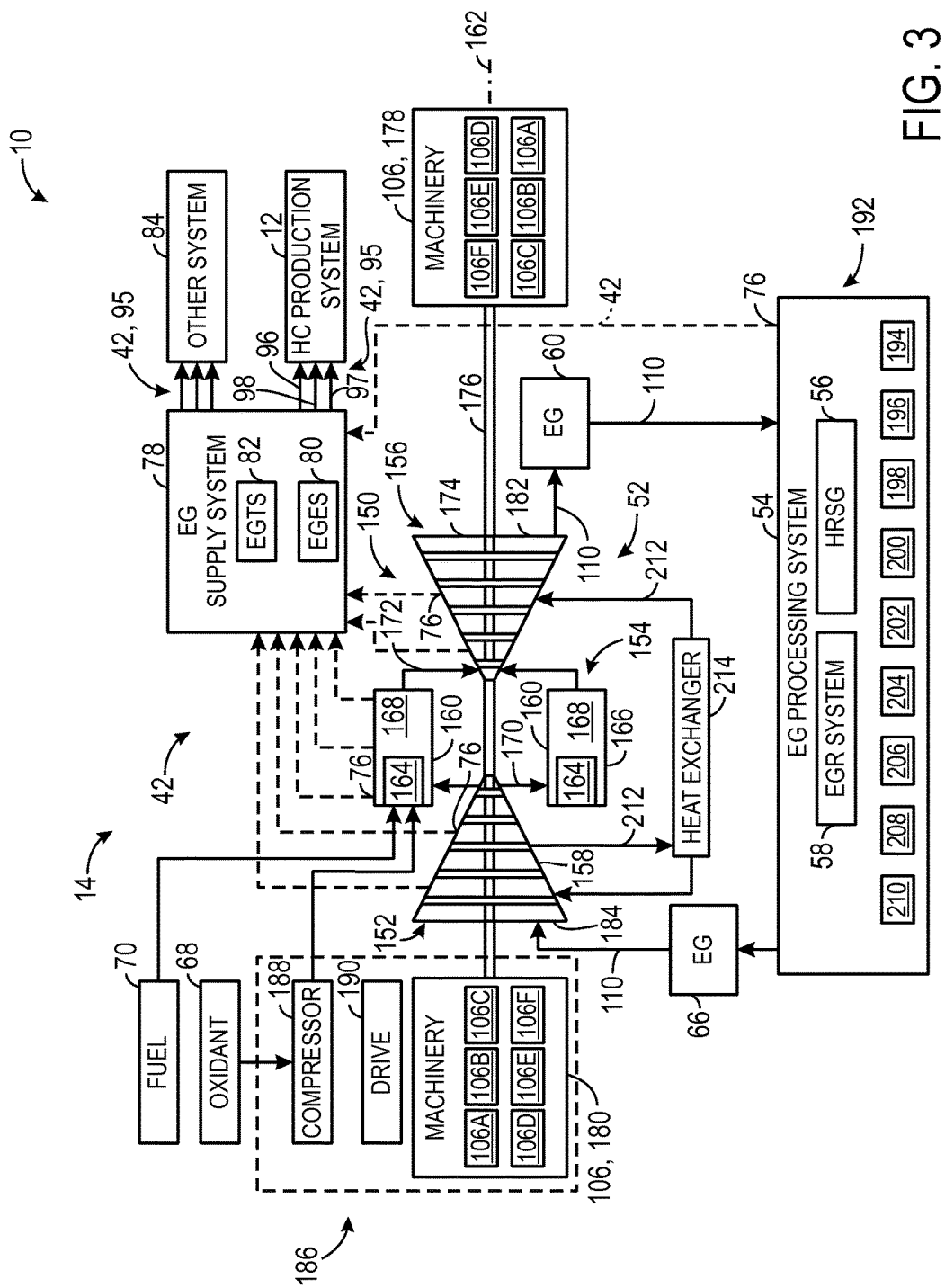
FIG. 3 is a diagram of an embodiment of the system of FIGS. 1 and 2, further illustrating details of a gas turbine engine, exhaust gas supply system, and exhaust gas processing system.

FIG. 3 is a diagram of embodiment of the system 10, further illustrating details of the SEGR gas turbine system 52 for use with the hydrocarbon production system 12 and/or other systems 84. In the illustrated embodiment, the SEGR gas turbine system 52 includes a gas turbine engine 150 coupled to the EG processing system 54. The illustrated gas turbine engine 150 includes a compressor section 152, a combustor section 154, and an expander section or turbine section 156. The compressor section 152 includes one or more exhaust gas compressors or compressor stages 158, such as 1 to 20 stages of rotary compressor blades disposed in a series arrangement. Likewise, the combustor section 154 includes one or more combustors 160, such as 1 to 20 combustors 160 distributed circumferentially about a rotational axis 162 of the SEGR gas turbine system 52. Furthermore, each combustor 160 may include one or more fuel nozzles 164 configured to inject the exhaust gas 66, the oxidant 68, and/or the fuel 70. For example, a head end portion 166 of each combustor 160 may house 1, 2, 3, 4, 5, 6, or more fuel nozzles 164, which may inject streams or mixtures of the exhaust gas 66, the oxidant 68, and/or the fuel 70 into a combustion portion 168 (e.g., combustion chamber) of the combustor 160.

The fuel nozzles 164 may include any combination of premix fuel nozzles 164 (e.g., configured to premix the oxidant 68 and fuel 70 for generation of an oxidant/fuel premix flame) and/or diffusion fuel nozzles 164 (e.g., configured to inject separate flows of the oxidant 68 and fuel 70 for generation of an oxidant/fuel diffusion flame). Embodiments of the premix fuel nozzles 164 may include swirl vanes, mixing chambers, or other features to internally mix the oxidant 68 and fuel 70 within the nozzles 164, prior to injection and combustion in the combustion chamber 168. The premix fuel nozzles 164 also may receive at least some partially mixed oxidant 68 and fuel 70. In certain embodiments, each diffusion fuel nozzle 164 may isolate flows of the oxidant 68 and the fuel 70 until the point of injection, while also isolating flows of one or more diluents (e.g., the exhaust gas 66, steam, nitrogen, or another inert gas) until the point of injection. In other embodiments, each diffusion fuel nozzle 164 may isolate flows of the oxidant 68 and the fuel 70 until the point of injection, while partially mixing one or more diluents (e.g., the exhaust gas 66, steam, nitrogen, or another inert gas) with the oxidant 68 and/or the fuel 70 prior to the point of injection. In addition, one or more diluents (e.g., the exhaust gas 66, steam, nitrogen, or another inert gas) may be injected into the combustor (e.g., into the hot products of combustion) either at or downstream from the combustion zone, thereby helping to reduce the temperature of the hot products of combustion and reduce emissions of $NO_X$ (e.g., NO and $NO_2$). Regardless of the type of fuel nozzle 164, the SEGR gas turbine system 52 may be controlled to provide substantially stoichiometric combustion of the oxidant 68 and fuel 70.

In diffusion combustion embodiments using the diffusion fuel nozzles 164, the fuel 70 and oxidant 68 generally do not mix upstream from the diffusion flame, but rather the fuel 70 and oxidant 68 mix and react directly at the flame surface and/or the flame surface exists at the location of mixing between the fuel 70 and oxidant 68. In particular, the fuel 70 and oxidant 68 separately approach the flame surface (or diffusion boundary/interface), and then diffuse (e.g., via molecular and viscous diffusion) along the flame surface (or diffusion boundary/interface) to generate the diffusion flame. It is noteworthy that the fuel 70 and oxidant 68 may be at a substantially stoichiometric ratio along this flame surface (or diffusion boundary/interface), which may result in a greater flame temperature (e.g., a peak flame temperature) along this flame surface. The stoichiometric fuel/oxidant ratio generally results in a greater flame temperature (e.g., a peak flame temperature), as compared with a fuel-lean or fuel-rich fuel/oxidant ratio. As a result, the diffusion flame may be substantially more stable than a premix flame, because the diffusion of fuel 70 and oxidant 68 helps to maintain a stoichiometric ratio (and greater temperature) along the flame surface. Although greater flame temperatures can also lead to greater exhaust emissions, such as $NO_X$ emissions, the disclosed embodiments use one or more diluents to help control the temperature and emissions while still avoiding any premixing of the fuel 70 and oxidant 68. For example, the disclosed embodiments may introduce one or more diluents separate from the fuel 70 and oxidant 68 (e.g., after the point of combustion and/or downstream from the diffusion flame), thereby helping to reduce the temperature and reduce the emissions (e.g., $NO_X$ emissions) produced by the diffusion flame.

In operation, as illustrated, the compressor section 152 receives and compresses the exhaust gas 66 from the EG processing system 54, and outputs a compressed exhaust gas 170 to each of the combustors 160 in the combustor section 154. Upon combustion of the fuel 60, oxidant 68, and exhaust gas 170 within each combustor 160, additional exhaust gas or products of combustion 172 (i.e., combustion gas) is routed into the turbine section 156. Similar to the compressor section 152, the turbine section 156 includes one or more turbines or turbine stages 174, which may include a series of rotary turbine blades. These turbine blades are then driven by the products of combustion 172 generated in the combustor section 154, thereby driving rotation of a shaft 176 coupled to the machinery 106. Again, the machinery 106 may include a variety of equipment coupled to either end of the SEGR gas turbine system 52, such as machinery 106, 178 coupled to the turbine section 156 and/or machinery 106, 180 coupled to the compressor section 152. In certain embodiments, the machinery 106, 178, 180 may include one or more electrical generators, oxidant compressors for the oxidant 68, fuel pumps for the fuel 70, gear boxes, or additional drives (e.g. steam turbine 104, electrical motor, etc.) coupled to the SEGR gas turbine system 52. Non-limiting examples are discussed in further detail below with reference to TABLE 1. As illustrated, the turbine section 156 outputs the exhaust gas 60 to recirculate along the exhaust recirculation path 110 from an exhaust outlet 182 of the turbine section 156 to an exhaust inlet 184 into the compressor section 152. Along the exhaust recirculation path 110, the exhaust gas 60 passes through the EG processing system 54 (e.g., the HRSG 56 and/or the EGR system 58) as discussed in detail above.

Again, each combustor 160 in the combustor section 154 receives, mixes, and stoichiometrically combusts the compressed exhaust gas 170, the oxidant 68, and the fuel 70 to produce the additional exhaust gas or products of combustion 172 to drive the turbine section 156. In certain embodiments, the oxidant 68 is compressed by an oxidant compression system 186, such as a main oxidant compression (MOC) system (e.g., a main air compression (MAC) system) having one or more oxidant compressors (MOCs). The oxidant compression system 186 includes an oxidant compressor 188 coupled to a drive 190. For example, the drive 190 may include an electric motor, a combustion engine, or any combination thereof. In certain embodiments, the drive 190 may be a turbine engine, such as the gas turbine engine 150. Accordingly, the oxidant compression system 186 may be an integral part of the machinery 106. In other words, the compressor 188 may be directly or indirectly driven by the mechanical power 72 supplied by the shaft 176 of the gas turbine engine 150. In such an embodiment, the drive 190 may be excluded, because the compressor 188 relies on the power output from the turbine engine 150. However, in certain embodiments employing more than one oxidant compressor is employed, a first oxidant compressor (e.g., a low pressure (LP) oxidant compressor) may be driven by the drive 190 while the shaft 176 drives a second oxidant compressor (e.g., a high pressure (HP) oxidant compressor), or vice versa. For example, in another embodiment, the HP MOC is driven by the drive 190 and the LP oxidant compressor is driven by the shaft 176. In the illustrated embodiment, the oxidant compression system 186 is separate from the machinery 106. In each of these embodiments, the compression system 186 compresses and supplies the oxidant 68 to the fuel nozzles 164 and the combustors 160. Accordingly, some or all of the machinery 106, 178, 180 may be configured to increase the operational efficiency of the compression system 186 (e.g., the compressor 188 and/or additional compressors).

The variety of components of the machinery 106, indicated by element numbers 106A, 106B, 106C, 106D, 106E, and 106F, may be disposed along the line of the shaft 176 and/or parallel to the line of the shaft 176 in one or more series arrangements, parallel arrangements, or any combination of series and parallel arrangements. For example, the machinery 106, 178, 180 (e.g., 106A through 106F) may include any series and/or parallel arrangement, in any order, of: one or more gearboxes (e.g., parallel shaft, epicyclic gearboxes), one or more compressors (e.g., oxidant compressors, booster compressors such as EG booster compressors), one or more power generation units (e.g., electrical generators), one or more drives (e.g., steam turbine engines, electrical motors), heat exchange units (e.g., direct or indirect heat exchangers), clutches, or any combination thereof. The compressors may include axial compressors, radial or centrifugal compressors, or any combination thereof, each having one or more compression stages. Regarding the heat exchangers, direct heat exchangers may include spray coolers (e.g., spray intercoolers), which inject a liquid spray into a gas flow (e.g., oxidant flow) for direct cooling of the gas flow. Indirect heat exchangers may include at least one wall (e.g., a shell and tube heat exchanger) separating first and second flows, such as a fluid flow (e.g., oxidant flow) separated from a coolant flow (e.g., water, air, refrigerant, or any other liquid or gas coolant), wherein the coolant flow transfers heat from the fluid flow without any direct contact. Examples of indirect heat exchangers include intercooler heat exchangers and heat recovery units, such as heat recovery steam generators. The heat exchangers also may include heaters. As discussed in further detail below, each of these machinery components may be used in various combinations as indicated by the non-limiting examples set forth in TABLE 1.

Generally, the machinery 106, 178, 180 may be configured to increase the efficiency of the compression system 186 by, for example, adjusting operational speeds of one or more oxidant compressors in the system 186, facilitating compression of the oxidant 68 through cooling, and/or extraction of surplus power. The disclosed embodiments are intended to include any and all permutations of the foregoing components in the machinery 106, 178, 180 in series and parallel arrangements, wherein one, more than one, all, or none of the components derive power from the shaft 176. As illustrated below, TABLE 1 depicts some non-limiting examples of arrangements of the machinery 106, 178, 180 disposed proximate and/or coupled to the compressor and turbine sections 152, 156.

TABLE 1

| 106A | 106B | 106C | 106D | 106E | 106F |
|------|------|------|------|------|------|
| MOC  | GEN  |      |      |      |      |
| MOC  | GBX  | GEN  |      |      |      |
| LP   | HP   | GEN  |      |      |      |
| MOC  | MOC  |      |      |      |      |
| HP   | GBX  | LP   | GEN  |      |      |

TABLE 1-continued

| 106A | 106B | 106C | 106D | 106E | 106F |
|------|------|------|------|------|------|
| MOC  |      | MOC  |      |      |      |
| MOC  | GBX  | GEN  |      |      |      |
| MOC  |      |      |      |      |      |
| HP MOC | GBX | GEN | LP MOC |   |   |
| MOC  | GBX  | GEN  |      |      |      |
| MOC  | GBX  | DRV  |      |      |      |
| DRV  | GBX  | LP MOC | HP MOC | GBX | GEN |
| DRV  | GBX  | HP MOC | LP MOC | GEN |   |
| HP MOC | GBX | LP CLR | GEN MOC |   |   |
| HP MOC | GBX | LP CLR | GBX MOC | GEN |   |
| HP MOC | GBX | LP | GEN |   |   |
| MOC  | HTR STGN | MOC |      |      |      |
| MOC  | GEN  | DRV  |      |      |      |
| MOC  | DRV  | GEN  |      |      |      |
| DRV  | MOC  | GEN  |      |      |      |
| DRV  | CLU  | MOC  | GEN  |      |      |
| DRV  | CLU  | MOC  | GBX  | GEN  |      |

As illustrated above in TABLE 1, a cooling unit is represented as CLR, a clutch is represented as CLU, a drive is represented by DRV, a gearbox is represented as GBX, a generator is represented by GEN, a heating unit is represented by HTR, a main oxidant compressor unit is represented by MOC, with low pressure and high pressure variants being represented as LP MOC and HP MOC, respectively, and a steam generator unit is represented as STGN. Although TABLE 1 illustrates the machinery 106, 178, 180 in sequence toward the compressor section 152 or the turbine section 156, TABLE 1 is also intended to cover the reverse sequence of the machinery 106, 178, 180. In TABLE 1, any cell including two or more components is intended to cover a parallel arrangement of the components. TABLE 1 is not intended to exclude any non-illustrated permutations of the machinery 106, 178, 180. These components of the machinery 106, 178, 180 may enable feedback control of temperature, pressure, and flow rate of the oxidant 68 sent to the gas turbine engine 150. As discussed in further detail below, the oxidant 68 and the fuel 70 may be supplied to the gas turbine engine 150 at locations specifically selected to facilitate isolation and extraction of the compressed exhaust gas 170 without any oxidant 68 or fuel 70 degrading the quality of the exhaust gas 170.

The EG supply system 78, as illustrated in FIG. 3, is disposed between the gas turbine engine 150 and the target systems (e.g., the hydrocarbon production system 12 and the other systems 84). In particular, the EG supply system 78, e.g., the EG extraction system (EGES) 80), may be coupled to the gas turbine engine 150 at one or more extraction points 76 along the compressor section 152, the combustor section 154, and/or the turbine section 156. For example, the extraction points 76 may be located between adjacent compressor stages, such as 2, 3, 4, 5, 6, 7, 8, 9, or 10 interstage extraction points 76 between compressor stages. Each of these interstage extraction points 76 provides a different temperature and pressure of the extracted exhaust gas 42. Similarly, the extraction points 76 may be located between adjacent turbine stages, such as 2, 3, 4, 5, 6, 7, 8, 9, or 10 interstage extraction points 76 between turbine stages. Each of these interstage extraction points 76 provides a different temperature and pressure of the extracted exhaust gas 42. By further example, the extraction points 76 may be located at a multitude of locations throughout the combustor section 154, which may provide different temperatures, pressures, flow rates, and gas compositions. Each of these extraction points 76 may include an EG extraction conduit, one or more valves, sensors, and controls, which may be used to selectively control the flow of the extracted exhaust gas 42 to the EG supply system 78.

The extracted exhaust gas 42, which is distributed by the EG supply system 78, has a controlled composition suitable for the target systems (e.g., the hydrocarbon production system 12 and the other systems 84). For example, at each of these extraction points 76, the exhaust gas 170 may be substantially isolated from injection points (or flows) of the oxidant 68 and the fuel 70. In other words, the EG supply system 78 may be specifically designed to extract the exhaust gas 170 from the gas turbine engine 150 without any added oxidant 68 or fuel 70. Furthermore, in view of the stoichiometric combustion in each of the combustors 160, the extracted exhaust gas 42 may be substantially free of oxygen and fuel. The EG supply system 78 may route the extracted exhaust gas 42 directly or indirectly to the hydrocarbon production system 12 and/or other systems 84 for use in various processes, such as enhanced oil recovery, carbon sequestration, storage, or transport to an offsite location. However, in certain embodiments, the EG supply system 78 includes the EG treatment system (EGTS) 82 for further treatment of the exhaust gas 42, prior to use with the target systems. For example, the EG treatment system 82 may purify and/or separate the exhaust gas 42 into one or more streams 95, such as the $CO_2$ rich, $N_2$ lean stream 96, the intermediate concentration $CO_2$, $N_2$ stream 97, and the $CO_2$ lean, $N_2$ rich stream 98. These treated exhaust gas streams 95 may be used individually, or in any combination, with the hydrocarbon production system 12 and the other systems 84 (e.g., the pipeline 86, the storage tank 88, and the carbon sequestration system 90).

Similar to the exhaust gas treatments performed in the EG supply system 78, the EG processing system 54 may include a plurality of exhaust gas (EG) treatment components 192, such as indicated by element numbers 194, 196, 198, 200, 202, 204, 206, 208, and 210. These EG treatment components 192 (e.g., 194 through 210) may be disposed along the exhaust recirculation path 110 in one or more series arrangements, parallel arrangements, or any combination of series and parallel arrangements. For example, the EG treatment components 192 (e.g., 194 through 210) may include any series and/or parallel arrangement, in any order, of: one or more heat exchangers (e.g., heat recovery units such as heat recovery steam generators, condensers, coolers, or heaters), catalyst systems (e.g., oxidation catalyst systems), particulate and/or water removal systems (e.g., inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, or any combination thereof. In certain embodiments, the catalyst systems may include an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a mixed metal oxide, or a combination thereof. The disclosed embodiments are intended to include any and all permutations of the foregoing components 192 in series and parallel arrangements. As illustrated below, TABLE 2 depicts some non-limiting examples of arrangements of the components 192 along the exhaust recirculation path 110.

TABLE 2

| 194 | 196 | 198 | 200 | 202 | 204 | 206 | 208 | 210 |
|---|---|---|---|---|---|---|---|---|
| CU | HRU | BB | MRU | PRU | | | | |
| CU | HRU | HRU | BB | MRU | PRU | DIL | | |
| CU | HRSG | HRSG | BB | MRU | PRU | | | |
| OCU | HRU | OCU | HRU | OCU | BB | MRU | PRU | |
| HRU CU | HRU CU | BB | MRU | PRU | | | | |
| HRSG OCU | HRSG OCU | BB | MRU | PRU | DIL | | | |
| OCU | HRSG OCU | OCU | HRSG OCU | OCU | BB | MRU | PRU | DIL |
| OCU | HRSG ST | HRSG ST | BB | COND | INER | WFIL | CFIL | DIL |
| OCU HRSG ST | OCU HRSG ST | BB | COND | INER | FIL | DIL | | |
| OCU | HRSG ST | HRSG ST | OCU | BB | MRU HE COND | MRU WFIL | PRU INER | PRU FIL CFIL |
| CU | HRU COND | HRU COND | HRU COND | BB | MRU HE COND WFIL | PRU INER | PRU FIL CFIL | DIL |

As illustrated above in TABLE 2, a catalyst unit is represented by CU, an oxidation catalyst unit is represented by OCU, a booster blower is represented by BB, a heat exchanger is represented by HX, a heat recovery unit is represented by HRU, a heat recovery steam generator is represented by HRSG, a condenser is represented by COND, a steam turbine is represented by ST, a particulate removal unit is represented by PRU, a moisture removal unit is represented by MRU, a filter is represented by FIL, a coalescing filter is represented by CFIL, a water impermeable filter is represented by WFIL, an inertial separator is represented by INER, and a diluent supply system (e.g., steam, nitrogen, or other inert gas) is represented by DIL. Although TABLE 2 illustrates the components 192 in sequence from the exhaust outlet 182 of the turbine section 156 toward the exhaust inlet 184 of the compressor section 152, TABLE 2 is also intended to cover the reverse sequence of the illustrated components 192. In TABLE 2, any cell including two or more components is intended to cover an integrated unit with the components, a parallel arrangement of the components, or any combination thereof. Furthermore, in context of TABLE 2, the HRU, the HRSG, and the COND are examples of the HE; the HRSG is an example of the HRU; the COND, WFIL, and CFIL are examples of the WRU; the INER, FIL, WFIL, and CFIL are examples of the PRU; and the WFIL and CFIL are examples of the FIL. Again, TABLE 2 is not intended to exclude any non-illustrated permutations of the components 192. In certain embodiments, the illustrated components 192 (e.g., 194 through 210) may be partially or completed integrated within the HRSG 56, the EGR system 58, or any combination thereof. These EG treatment components 192 may enable feedback control of temperature, pressure, flow rate, and gas composition, while also removing moisture and particulates from the exhaust gas 60. Furthermore, the treated exhaust gas 60 may be extracted at one or more extraction points 76 for use in the EG supply system 78 and/or recirculated to the exhaust inlet 184 of the compressor section 152.

As the treated, recirculated exhaust gas 66 passes through the compressor section 152, the SEGR gas turbine system 52 may bleed off a portion of the compressed exhaust gas along one or more lines 212 (e.g., bleed conduits or bypass conduits). Each line 212 may route the exhaust gas into one or more heat exchangers 214 (e.g., cooling units), thereby cooling the exhaust gas for recirculation back into the SEGR gas turbine system 52. For example, after passing through the heat exchanger 214, a portion of the cooled exhaust gas may be routed to the turbine section 156 along line 212 for cooling and/or sealing of the turbine casing, turbine shrouds, bearings, and other components. In such an embodiment, the SEGR gas turbine system 52 does not route any oxidant 68 (or other potential contaminants) through the turbine section 156 for cooling and/or sealing purposes, and thus any leakage of the cooled exhaust gas will not contaminate the hot products of combustion (e.g., working exhaust gas) flowing through and driving the turbine stages of the turbine section 156. By further example, after passing through the heat exchanger 214, a portion of the cooled exhaust gas may be routed along line 216 (e.g., return conduit) to an upstream compressor stage of the compressor section 152, thereby improving the efficiency of compression by the compressor section 152. In such an embodiment, the heat exchanger 214 may be configured as an interstage cooling unit for the compressor section 152. In this manner, the cooled exhaust gas helps to increase the operational efficiency of the SEGR gas turbine system 52, while simultaneously helping to maintain the purity of the exhaust gas (e.g., substantially free of oxidant and fuel).

Figure 4:
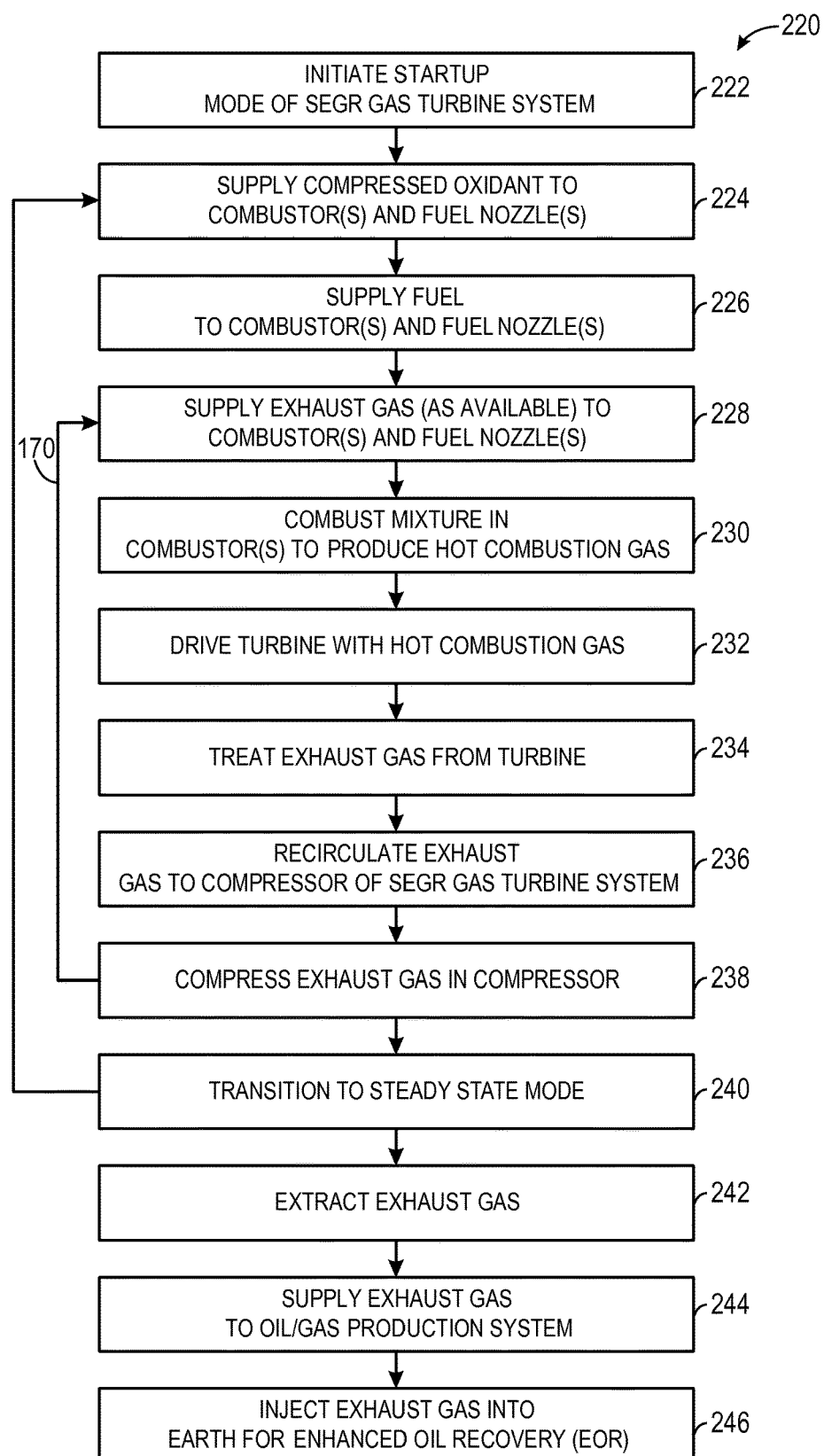
FIG. 4 is a flow chart of an embodiment of a process for operating the system of FIGS. 1-3.

FIG. 4 is a flow chart of an embodiment of an operational process 220 of the system 10 illustrated in FIGS. 1-3. In certain embodiments, the process 220 may be a computer implemented process, which accesses one or more instructions stored on the memory 122 and executes the instructions on the processor 120 of the controller 118 shown in FIG. 2. For example, each step in the process 220 may include instructions executable by the controller 118 of the control system 100 described with reference to FIG. 2.

The process 220 may begin by initiating a startup mode of the SEGR gas turbine system 52 of FIGS. 1-3, as indicated by block 222. For example, the startup mode may involve a gradual ramp up of the SEGR gas turbine system 52 to maintain thermal gradients, vibration, and clearance (e.g., between rotating and stationary parts) within acceptable thresholds. For example, during the startup mode 222, the process 220 may begin to supply a compressed oxidant 68 to the combustors 160 and the fuel nozzles 164 of the combustor section 154, as indicated by block 224. In certain embodiments, the compressed oxidant may include a compressed air, oxygen, oxygen-enriched air, oxygen-reduced air, oxygen-nitrogen mixtures, or any combination thereof. For example, the oxidant 68 may be compressed by the oxidant compression system 186 illustrated in FIG. 3. The process 220 also may begin to supply fuel to the combustors 160 and the fuel nozzles 164 during the startup mode 222, as indicated by block 226. During the startup mode 222, the process 220 also may begin to supply exhaust gas (as available) to the combustors 160 and the fuel nozzles 164, as indicated by block 228. For example, the fuel nozzles 164 may produce one or more diffusion flames, premix flames, or a combination of diffusion and premix flames. During the startup mode 222, the exhaust gas 60 being generated by the gas turbine engine 156 may be insufficient or unstable in quantity and/or quality. Accordingly, during the startup mode, the process 220 may supply the exhaust gas 66 from one or more storage units (e.g., storage tank 88), the pipeline 86, other SEGR gas turbine systems 52, or other exhaust gas sources.

The process 220 may then combust a mixture of the compressed oxidant, fuel, and exhaust gas in the combustors 160 to produce hot combustion gas 172, as indicated by block 230. In particular, the process 220 may be controlled by the control system 100 of FIG. 2 to facilitate stoichiometric combustion (e.g., stoichiometric diffusion combustion, premix combustion, or both) of the mixture in the combustors 160 of the combustor section 154. However, during the startup mode 222, it may be particularly difficult to maintain stoichiometric combustion of the mixture (and thus low levels of oxidant and unburnt fuel may be present in the hot combustion gas 172). As a result, in the startup mode 222, the hot combustion gas 172 may have greater amounts of residual oxidant 68 and/or fuel 70 than during a steady state mode as discussed in further detail below. For this reason, the process 220 may execute one or more control instructions to reduce or eliminate the residual oxidant 68 and/or fuel 70 in the hot combustion gas 172 during the startup mode.

The process 220 then drives the turbine section 156 with the hot combustion gas 172, as indicated by block 232. For example, the hot combustion gas 172 may drive one or more turbine stages 174 disposed within the turbine section 156. Downstream of the turbine section 156, the process 220 may treat the exhaust gas 60 from the final turbine stage 174, as indicated by block 234. For example, the exhaust gas treatment 234 may include filtration, catalytic reaction of any residual oxidant 68 and/or fuel 70, chemical treatment, heat recovery with the HRSG 56, and so forth. The process 220 may also recirculate at least some of the exhaust gas 60 back to the compressor section 152 of the SEGR gas turbine system 52, as indicated by block 236. For example, the exhaust gas recirculation 236 may involve passage through the exhaust recirculation path 110 having the EG processing system 54 as illustrated in FIGS. 1-3.

In turn, the recirculated exhaust gas 66 may be compressed in the compressor section 152, as indicated by block 238. For example, the SEGR gas turbine system 52 may sequentially compress the recirculated exhaust gas 66 in one or more compressor stages 158 of the compressor section 152. Subsequently, the compressed exhaust gas 170 may be supplied to the combustors 160 and fuel nozzles 164, as indicated by block 228. Steps 230, 232, 234, 236, and 238 may then repeat, until the process 220 eventually transitions to a steady state mode, as indicated by block 240. Upon the transition 240, the process 220 may continue to perform the steps 224 through 238, but may also begin to extract the exhaust gas 42 via the EG supply system 78, as indicated by block 242. For example, the exhaust gas 42 may be extracted from one or more extraction points 76 along the compressor section 152, the combustor section 154, and the turbine section 156 as indicated in FIG. 3. In turn, the process 220 may supply the extracted exhaust gas 42 from the EG supply system 78 to the hydrocarbon production system 12, as indicated by block 244. The hydrocarbon production system 12 may then inject the exhaust gas 42 into the earth 32 for enhanced oil recovery, as indicated by block 246. For example, the extracted exhaust gas 42 may be used by the exhaust gas injection EOR system 112 of the EOR system 18 illustrated in FIGS. 1-3.

As noted above, it may be particularly difficult to maintain stoichiometric combustion (or combustion at a predetermined stoichiometric ratio) between the fuel 70 and oxidant 68. For example, variations in the composition of the fuel 70 and oxidant 68, variations in flow rates of the fuel 70 and oxidant 68, or other such variations can lead to non-stoichiometric combustion, or combustion at a stoichiometric ratio that deviates from a set value. Again, this may result in residual oxidant 68 and/or fuel in the hot combustion gas 172, which may be undesirable in certain downstream processes.

In accordance with present embodiments, as set forth above, the control system 100, in performing the process 220, may execute one or more control routines to enable combustion at desired fuel/oxidant stoichiometric ratios in the combustor 160. In one control routine, the control system 100 may receive information relating to flow rates and/or compositions of the oxidant 68 and/or the fuel 70, and the control system 100 may utilize feed forward control based on all or a portion of this information to adjust a flow of the fuel 70 and/or the oxidant 68 to the combustor 160.

In another control routine, the control system 100 may receive information relating to flow rates and/or compositions of the exhaust 60, 66, and the control system 100 may utilize feedback control based on all or a portion of this information to adjust a flow of the fuel 70 and/or the oxidant 68 to the combustor 160. In certain of these embodiments, the control system 100 may utilize model-based analyses to determine the feedback control.

Figure 5:
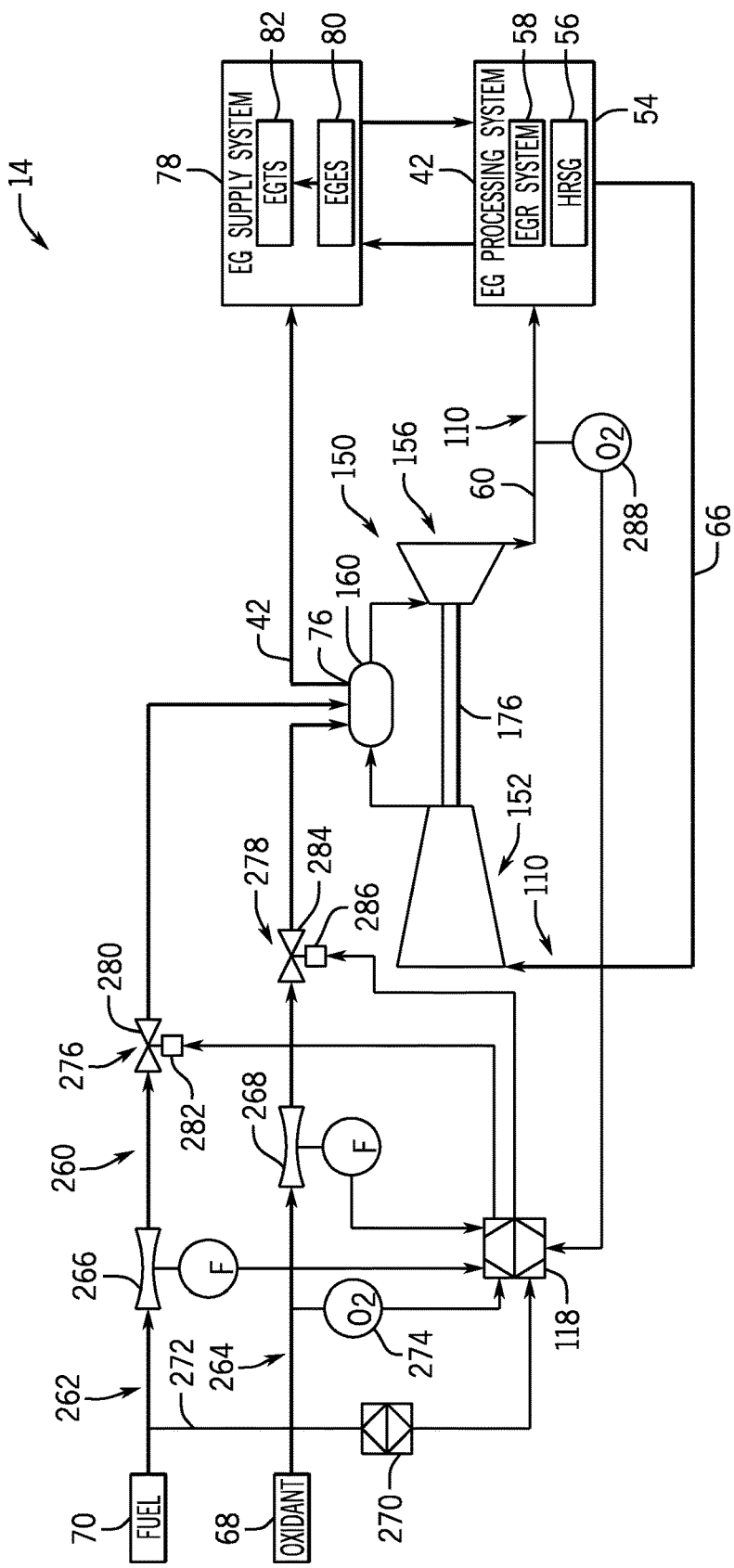
FIG. 5 is a diagram of an embodiment of the system of FIGS. 1-3, further illustrating details of a control system, fuel analysis system and various sensors configured to determine composition and flow information relating to process streams of the system.

The control routines noted above may be used together. That is, in certain embodiments, the control system 100 may utilize both feed forward and feedback control. One embodiment of the control system 100 and examples of associated analysis features suitable for performing such control routines are illustrated diagrammatically in FIG. 5. In particular, FIG. 5 depicts an embodiment of the turbine-based service system 14 having the gas turbine engine 150, the EG supply system 78, the EG processing system 54, and an equivalence ratio control system 260 having the controller 118 and a number of sensing features, which are discussed in detail below.

In general, the equivalence ratio control system 260 is configured to control flows of the oxidant 68 and/or the fuel 70 to enable stoichiometric combustion, or combustion at a predetermined equivalence ratio (e.g., approximately 0.95 to 1.05 or about 1.0), of the oxidant 68 and the fuel 70 in the combustor 160 to provide substantially stoichiometric combustion. For example, the equivalence ratio control system 260 may adjust a flow of the fuel 70 along a fuel supply path 262, a flow of the oxidant 68 along an oxidant supply path 264, or a combination thereof, in response to information related to the flow of the fuel 70, the flow of the oxidant 68, and operating conditions within the combustor 160. The information relating to the operating conditions may include data indicative of the combustion dynamics in the combustor 160, such as an actual fuel-to-oxidant ratio of combustion within the combustor 160. In response to this information, the equivalence ratio control system 260, and more particularly the controller 118, may adjust either or both of the flows of the fuel 70 and/or oxidant 68 along their respective supply paths 262, 264 to move the dynamics toward a predetermined equivalence ratio or fuel-to-oxidant ratio (e.g., a stoichiometric fuel-to-oxidant ratio), which may be used as a set point. Again, the routines performed by the controller 118 may include either or both of a feed forward or feedback mechanism. In embodiments where both are utilized for control, the control may be considered to have a feedback component and a feed forward component. The feed forward component may be utilized to establish a baseline, or coarse, flow rate for the fuel 70 along the fuel supply path 262, while the feedback component may be utilized to refine the flow rate of the fuel 70 by accounting for drift or other flow variations. Additionally or alternatively, a flow rate of the oxidant 68 may be adjusted according to these mechanisms.

In accordance with the present disclosure, the feed forward component of the control performed by the controller 118 is enabled by the analysis of at least fuel composition, and oxidant composition, and in certain embodiments, in addition to the composition information, flow rates for the fuel 70 and/or oxidant 68, ambient temperature, humidity, and so forth, which may be provided intermittently, at regular intervals, or substantially continuously to the controller 118. Accordingly, as depicted, the equivalence ratio control system 260 includes a fuel flow meter 266 configured to measure or otherwise determine a flow rate of the fuel 70 flowing along the fuel supply path 262. The fuel flow meter 266 may be positioned along the fuel supply path 262 as depicted, or may receive a slip stream of the fuel 70 that is representative of the fuel 70 flowing along the fuel supply path 262. Similarly, the equivalence ratio control system 260 includes an oxidant flow meter 268 configured to measure or otherwise determine a flow rate of the oxidant 68 flowing along the oxidant supply path 264. The oxidant flow meter 268 may be positioned along the oxidant supply path 264 as depicted, or may receive a slip stream of the oxidant 68 that is representative of the oxidant 68 flowing along the oxidant supply path 264.

The fuel flow meter 266 and the oxidant flow meter 268 may independently include one or more of any suitable type of flow analysis devices, including but not limited to thermal mass flow meters, Coriolis mass flow meters, mass flow controllers, rotary piston meters, gear meters, Venturi meters, orifice plate meters, dall tube meters, Pitot tube meters, multi-hole pressure probe meters, cone meters, optical flow meters, electromagnetic flow meters, or ultrasonic flow meters. The fuel flow meter 266 and the oxidant flow meter 268, as illustrated, are communicatively coupled to the controller 118, and may provide, intermittently, at regular intervals, or substantially continuously, feedback indicative of the respective flow rates of the fuel 70 and the oxidant 68, or may provide the actual flow rate values. For example, in embodiments where the fuel flow meter 266 and/or the oxidant flow meter 268 are pressure-based flow meters, the controller 118 may receive pressure data, and may determine the flow rate based on the received pressure data. Accordingly, in certain embodiments, the controller 118 may include code stored on the memory 122 for performing calculations on the raw data to determine their associated flow rates. In other embodiments, the controller 118 may receive the actual flow rates from the fuel flow meter 266 and/or the oxidant flow meter 268, and may use this data according to the algorithms/routines discussed below.

As noted above, the controller 118 also utilizes composition information to generate the feed forward component. In accordance with an embodiment, a fuel analysis system 270 may determine composition information related to the fuel 70. For example, the fuel analysis system 270 may determine a concentration of, or relative amounts of, combustible components within the fuel 70, which may include but are not limited to CO, $H_2$, and methane ($CH_4$). Accordingly, the fuel analysis system 270 may include one or more analysis features capable of separating, detecting, and/or analyzing such components. For example, the fuel analysis system 270 may include any one or a combination of a gas chromatograph, an infrared spectrometer, an ultraviolet/visible spectrometer, a fluorometer, a mass spectrometer, a nuclear magnetic resonance (NMR) spectrometer, an electron spin resonance (ESR) spectrometer, an atomic absorption unit, or the like. In some embodiments, the fuel analysis system 270 may include a CO sensor, an $H_2$ sensor, a $CH_4$ sensor, or similar sensors.

While the fuel analysis system 270 may be suitably positioned at any point along the fuel supply path 262, in the illustrated embodiment, the fuel analysis system 270 is configured to receive a slip stream 272 of the fuel 70 from the fuel supply path 262. That is, in the illustrated embodiment, the slip stream 272 is provided along a path diverging from the fuel supply path 262 to the fuel analysis system 270. During operation, the fuel analysis system 270 analyzes the fuel 70, such as for CO, $H_2$, and $CH_4$ concentrations, and sends the fuel composition information, intermittently, at regular intervals, or substantially continuously, to the controller 118. In other embodiments, the fuel analysis system 270 may provide, intermittently, at regular intervals, or substantially continuously, raw data (e.g., detector signals) to the controller 118, which may include code for analyzing the data.

The controller 118 also utilizes oxidant composition information for determining the feed forward component. As noted above, the oxidant 68 will generally include compressed ambient air, compressed oxygen-enriched air, compressed oxygen-depleted air, oxygen, or similar oxidant flow. Because the oxidizing agent generally utilized during the combustion process includes oxygen ($O_2$), the equivalence ratio control system 270, as illustrated, includes an oxygen sensor 274 disposed along the oxidant supply path 264. The oxygen sensor 274 may include any suitable sensor capable of measuring/detecting an amount of oxygen in the flow of the oxidant 68. Such sensors include, but are not limited to, zirconia-based, electrochemical-based, infrared-based, ultrasonic-based, and laser-based oxygen sensors. The oxygen sensor 274 is communicatively coupled to the controller 118 to provide, intermittently, at regular intervals, or substantially continuously, feedback indicative of the amount of $O_2$ in the oxidant 68 flowing through the oxidant supply path 264. In certain embodiments, the amount of $O_2$ in the oxidant 68 may be assumed or estimated, with the amount assumed or estimated depending on the source of the oxidant 68 (e.g., ambient air, oxygen-enriched or oxygen-depleted air).

Although illustrated as having only one fuel analysis system 270 and one oxygen sensor 274, the equivalence ratio control system 260 may have more than one of each, such as two, three, four, five, or more of each. Indeed, any number of such sensors is presently contemplated. Furthermore, the positioning of the fuel analysis system 270 and the oxygen sensor 274 is not limited to their illustrated positions. For example, the fuel analysis system 270 may be positioned at any point along the fuel supply path 262, and the oxygen sensor 274 may be positioned at any point along the oxidant supply path 264. Further, as noted above, in certain embodiments the oxygen sensor 274 may not be positioned along the oxidant supply path 264 and may receive a slip stream of the oxidant 68 for analysis.

Again, the feed forward component of the control actions performed by the controller 118 may result in an adjustment to the flow rate of the fuel 70 along the fuel supply path 262 and/or an adjustment to the flow rate of the oxidant 68 along the oxidant supply path 264. Accordingly, in addition to the sensing features discussed above, the controller 118 is also communicatively coupled to a fuel flow control system 276 and an oxidant flow control system 278. The fuel flow control system 276, as illustrated, includes at least a fuel flow control valve 280 and a fuel flow control valve actuator 282. The fuel flow control valve 280 is disposed along the fuel supply path 262, and is configured stop, start, reduce, or increase a flow of the fuel 70 along the fuel supply path 262, depending on its position relative to the fuel supply path 262. The position of the fuel flow control valve 280 is adjusted by the fuel flow control valve actuator 282, which may be a servo motor or similar motive device (e.g., a stepper motor). In such embodiments, the fuel flow control valve actuator 282 may include a servo positioning system, such as a local processing device configured to receive control signals from the controller 118 and, as a result of the control signals, cause the fuel flow control valve actuator 282 to actuate the fuel flow control valve 280 accordingly. In other embodiments, such as when the fuel flow control system 276 does not process data or determine appropriate servo positioning based on the control signals, the controller 118 may determine the proper servo positioning, and may send an appropriate control signal to the flow control valve actuator 282 to adjust its position. Indeed, in certain embodiments, the controller 118 may include one or more servo positioning modules each configured to provide an appropriate signal to the flow control systems disclosed herein to adjust their respective positions to attain a desired level of flow.

Similarly, the oxidant flow control system 278, as illustrated, includes an oxidant flow control valve 284 and an oxidant flow control valve actuator 286. The oxidant flow control valve 284 is disposed along the oxidant supply path 264, and is configured to adjust a flow of the oxidant 68 along the oxidant supply path 264, depending on its position relative to the oxidant supply path 264. The position of the oxidant flow control valve 284 is adjusted by the oxidant flow control valve actuator 286, which may be a servo motor or similar motive device. In such embodiments, the oxidant flow control valve actuator 286 may include a servo positioning system, such as a local processing device configured to receive control signals from the controller 118 and, as a result of the control signals, cause the oxidant flow control valve actuator 286 to actuate the oxidant flow control valve 284 accordingly. In other embodiments, such as when the oxidant flow control system 278 does not process data or determine appropriate servo positioning based on the control signals, the controller 118 may determine the proper servo positioning, and may send an appropriate control signal to the oxidant control valve actuator 286 to adjust its position.

Again, the controller 118 receives the information noted above (e.g., intermittently, at regular intervals, or substantially continuously), including fuel composition and flow information, oxidant composition and flow information, ambient conditions (e.g., temperature, humidity), temperature information about the fuel 70 and/or oxidant 68, or any combination thereof, to generate a feed forward component of control to adjust a flow of the fuel 70 and/or the oxidant 68 to the combustor 160. For example, if the fuel composition changes (e.g., due to variations in fuel feedstock used to generate the fuel), if the oxidant flow changes (e.g., due to operational variability in the main oxidant compressor), or the like, the controller 118 may send control signals to either or both of the fuel flow control system 276 and the oxidant flow control system 278 to adjust a flow of the fuel 70 and the oxidant 68. However, as noted above, in addition to such feed forward control, the controller 118 may also perform feedback control, in which the controller 118 adjusts either or both of the fuel and/or oxidant flows to the combustor 160 as a result of feedback indicative of the combustion process occurring within the combustor 160.

For example, as depicted, the equivalence ratio control system 260 also includes an exhaust oxygen sensor 288 disposed along the exhaust recirculation path 110, which may include a flow path through the compressor section 152, the combustor section 154, the turbine section 156 (FIG. 3), and the EG processing system 54. The exhaust oxygen sensor 288 is configured to determine an amount (e.g., a concentration in mass, volume, and/or moles) of oxygen within the exhaust gas 60, and is communicatively coupled to the controller 118 so as to provide this compositional information to the controller 118. While illustrated as disposed along the exhaust recirculation path 110, the exhaust oxygen sensor 288, or another exhaust oxygen sensor, may not be positioned along the exhaust recirculation path 110 but may receive a slip stream of the exhaust gas 60 from the exhaust recirculation path 110 to determine the amount of oxygen in the exhaust gas 60. Furthermore, one or more exhaust oxygen sensors may be positioned at one or more of the extraction points 76 (FIG. 3). Indeed, in some embodiments, it may be desirable to sense the exhaust gas composition of the exhaust gas 60 being provided to the compressor section 152, because the composition of the exhaust gas 60 may impact the combustion dynamics and the products of combustion.

The compositional information relating to the exhaust gas 60 is not limited to the oxygen content of the exhaust gas 60. Rather, the compositional information relating to the exhaust gas 60 may include information relating to CO, $H_2$, $CH_4$, $NO_x$, water, or other components, within the exhaust gas 60. Accordingly, the equivalence ratio control system 260 may include any one or a combination of sensors capable of detecting $O_2$, CO, $CO_2$, $H_2$, $CH_4$, water, $NO_x$, or similar combustion/partial combustion products. In addition, because it may be desirable to provide accurate information relating to these potential products of combustion, the sensors (e.g., the exhaust oxygen sensor 288) may be positioned along the exhaust recirculation path 110 between the turbine section 156 and the EG processing system 52, such as before the exhaust gas 60 passes through catalyst treatment, where certain components (e.g., CO, $H_2$, $O_2$, $NO_x$) may be removed from the exhaust gas 60.

As discussed in detail below, the controller 118 may utilize the compositional information obtained relating to the exhaust gas 60, and may generate a feedback component of control for adjusting, when appropriate, the flow of the fuel 70 through the fuel supply path 262 and/or the flow of the oxidant 68 along the oxidant supply path 264 to adjust the ratio of fuel 70 to oxidant 68, for example to achieve stoichiometric combustion. Additionally or alternatively, the controller 118 may utilize model-based control in which the outputs of the sensors are used as inputs to a model that generates an input for the controller 118. Example models include physics-based models, computational fluid dynamics (CFD) models, or finite element analysis (FEA) models. Models may also include artificial intelligence (AI) models, such as expert systems (e.g. forward chained expert systems, backward chained expert systems), neural networks, fuzzy logic systems, state vector machines (SVMs), inductive reasoning systems, Bayesian inference systems, or a combination thereof.

In certain embodiments, the controller 118 may maintain the oxidant flow at a predetermined rate not to achieve stoichiometric combustion, but to control loading on the gas turbine engine 150. On the other hand, the controller 118 may adjust the flow of the fuel 70 to maintain the desired equivalence ratio. For example, because the oxidant flow may be controlled by varying various compressor components (e.g., inlet guide vanes), the response by such components to change the oxidant flow may be relatively slow (e.g., between 3 and 5 seconds). This may not be suitable for responding to rapid changes in composition. The flow of the fuel 70, however, may be more rapidly adjusted by moving flow control valves in the manner discussed in detail below. Indeed, adjusting the flow of the fuel 70 may more rapidly address various changes in the composition of the oxidant 68 and/or fuel 70, and/or changes in the flow of the oxidant 68. While changing only the flow of the fuel 70 to maintain stoichiometric combustion may be desirable for at least these reasons, the present disclosure is not limited to such operation. In other words, the flow of the oxidant 68 may, in addition to or in lieu of adjusting fuel flow, be changed to maintain stoichiometric combustion, or combustion at a target equivalence ratio.

As noted above, the controller 118 is configured to control flows of the fuel 70 and/or the oxidant 68 along the fuel supply path 262 and/or the oxidant supply path 264, respectively, using a feed forward control component, a feedback control component, or a combination thereof. In particular, the controller 118, as discussed above with respect to FIG. 2, includes the processor 120 and the memory 122, wherein the processor 120 may include one or more processing devices, and the memory 122 may include one or more tangible, non-transitory, machine-readable media collectively storing instructions (e.g., routines) executable by the processor 120 to perform the analysis and control actions described herein. In an embodiment, the one or more sets of instructions may be performed to generate the feed forward control component, the feedback control component, or combination thereof.

Figure 6:
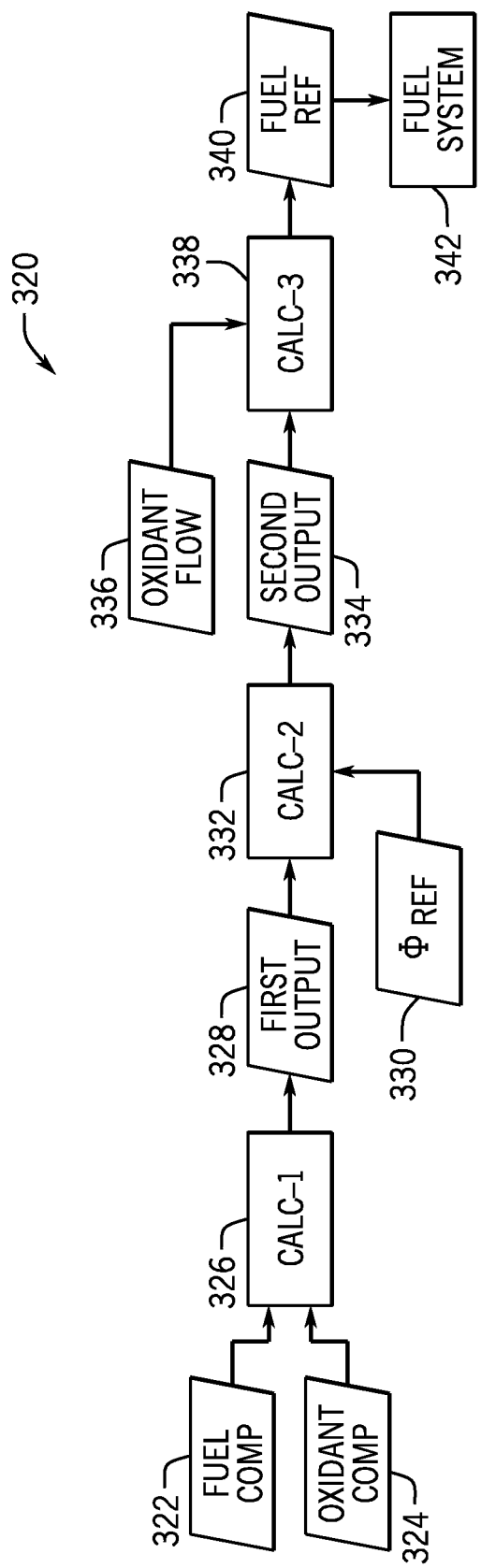
FIG. 6 is a flow chart of an embodiment of a process for determining a control input for operating the equivalence ratio control system of FIG. 5.

FIG. 6 illustrates a flow diagram of an embodiment of a feed forward control algorithm 320 in which the flow of the fuel 70 along the fuel supply path 262 (FIG. 5) is controlled using fuel and oxidant composition and/or flow information. Specifically, as illustrated, the feed forward control algorithm 320 begins with a fuel composition input 322 and an oxidant composition input 324. The fuel composition input 322 may include information such as a concentration of various combustible components of the fuel 70 (e.g., CO, $H_2$, $CH_4$), and may be provided, as discussed above with respect to FIG. 5, by the fuel analysis system 270 to the controller 118.

The oxygen sensor 274 may supply the oxidant composition input 324 to the controller 118, or a user may input the source of the oxidant 68 (e.g., ambient air, oxygen-enriched air, oxygen-depleted air, or oxygen) to the controller 118 via the local or remote interfaces 132, 134 (FIG. 2). Accordingly, in an embodiment, the oxygen composition input 324 may include a concentration of $O_2$ in the oxidant 68, a partial pressure of $O_2$ in the oxidant 68, a flow rate of $O_2$ along the oxidant supply path 264, or any combination of these or similar measurements of $O_2$ in the oxidant 68. The concentration information discussed herein may also be provided in terms of mass per unit volume, mass per unit flow, molarity (moles per unit volume), or other similar metrics.

Using the fuel and oxidant composition inputs 322, 324, the processor 120 executes the one or more sets of instructions to perform a first calculation 326, denoted in FIG. 6 as CALC-1, to determine a first output 328. The first output 328 may be a fuel-to-oxidant ratio that is suitable for stoichiometric combustion for a given fuel supply (e.g., the particular source of the fuel 70, which affects the composition of the fuel 70), or an equivalence ratio based on the composition of the fuel 70 and oxidant 68 and the flow of the fuel 70 and oxidant 68. In embodiments where the first output 328 is a fuel-to-oxidant ratio suitable for stoichiometric combustion of the fuel 70 and the oxidant 68, this is denoted herein as $FOR_{ST}$.

The feed forward control algorithm 320 also utilizes an input equivalence ratio 330, denoted as $\Phi_{REF}$, which represents a set point equivalence ratio. In other words, $\Phi_{REF}$ 330 represents a target for the controller 118. Therefore, in embodiments in which stoichiometric combustion is desired, the $\Phi_{REF}$ 330 may be between approximately 0.95 and 1.05 such that the target for the controller 118 is such that the products of combustion produced within the combustor 160 are substantially free of $O_2$, with residual amounts being converted into other forms (e.g., reduced) using one or more catalysts in the EG processing system 54 (FIG. 2).

$\Phi_{REF}$ 330 and the first output 328 (e.g., $FOR_{ST}$) are subjected to a second calculation 332, denoted as CALC-2, in which a second output 334 is determined. In one embodiment, the processor 120 may execute the one or more sets of instructions to determine the second output 334 by, for example multiplying $\Phi_{REF}$ 330 by $FOR_{ST}$. Accordingly, the second output 328 may be a desired, target, or reference fuel-to-oxidant ratio (denoted as $FOR_{REF}$). In other words, CALC-2 332, in some embodiments, may be a multiplicative step.

Using the second output 334 and an oxidant flow value 336 (e.g., a flow rate of the oxidant 68 obtained from the oxidant flow meter 274 of FIG. 5), the controller performs a third calculation 338, denoted as CALC-3, which may be a feed forward calculation, to determine a fuel flow reference value 340 (e.g., a desired or reference fuel flow). In one embodiment, the third calculation 338 may include multiplying the oxidant flow value 336 by the second output 334 ($FOR_{REF}$), to determine an appropriate fuel flow value (e.g., a flow rate for the fuel 70) for stoichiometric combustion, or for combustion at a desired equivalence ratio (determined by $\phi_{REF}$ 330).

As depicted in FIG. 6, the fuel flow reference value 340 is provided to a fuel system 342 to determine the appropriate positioning of the fuel flow control valve 280 (FIG. 5). The fuel system 342 determination may be performed by a servo position control module of the controller 118, or may be a part of the fuel flow control system 276 (e.g., implemented on the fuel flow control valve actuator 282 of FIG. 5).

In accordance with present embodiments, the feed forward control algorithm 320 may be considered to be a feed forward control mechanism in that the fuel flow is controlled based on inputs that are not related to the process that the algorithm 320 is attempting to control. In other words, the algorithm 320 does not receive feedback indicating whether the combustion in the combustor 160 is at the desired equivalence ratio. Rather, the algorithm 320 simply determines the fuel flow reference value 340 based on information that is independent of the combustion process. Again, such feed forward control may be utilized to establish a baseline or coarse flow for the fuel 70 along the fuel supply path 262.

Figure 7:
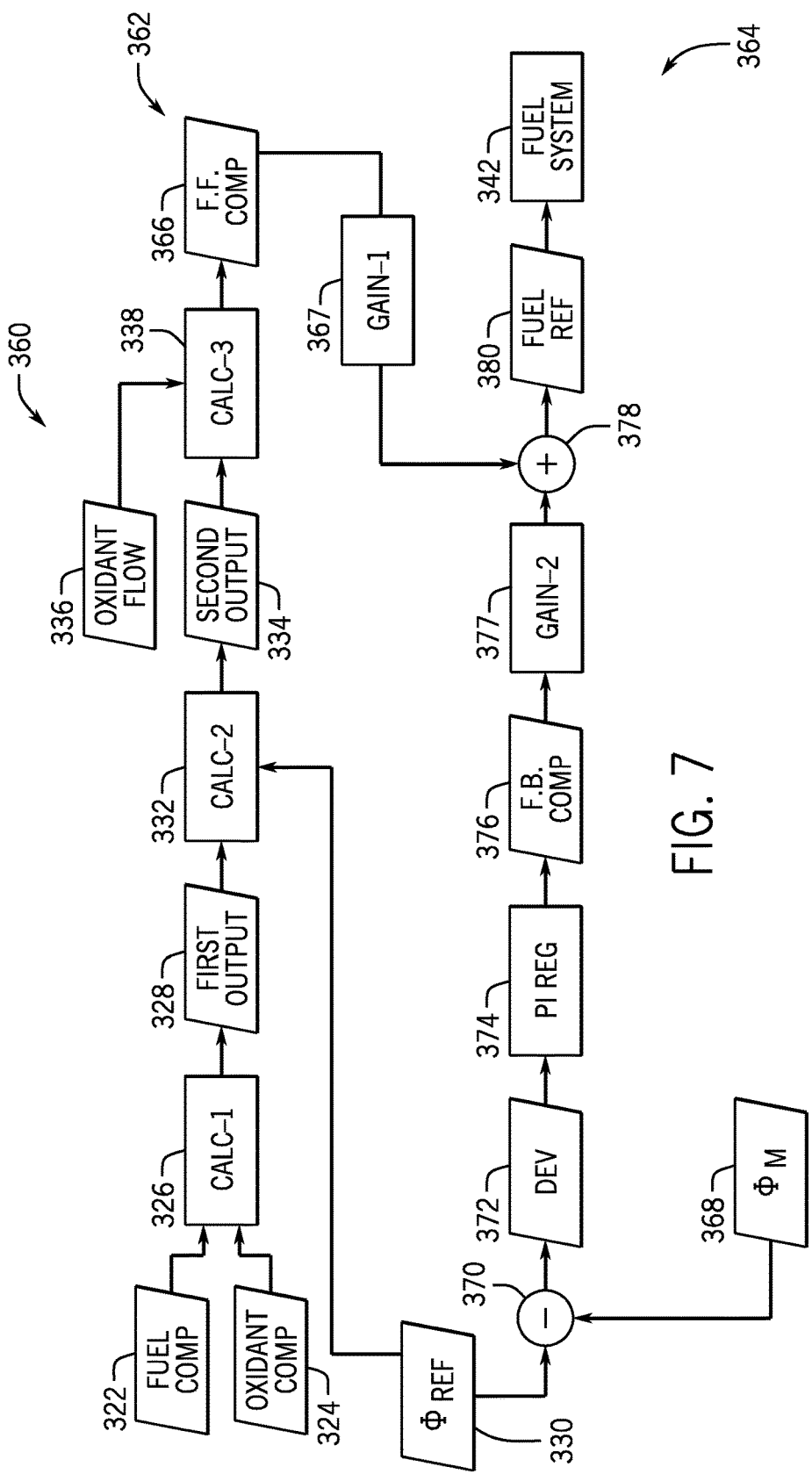
FIG. 7 is a flow chart of an embodiment of a process for determining a control input for operating the equivalence ratio control system of FIG. 5.

As noted above, while feed forward control may be utilized to establish such a flow, feedback control may be utilized to refine the flow of the fuel 70 to account for measurement imperfections, or drifts or other variations in the respective flows of the fuel 70 and/or oxidant 68. Accordingly, the present embodiments also provide an embodiment of a combined control algorithm 360, illustrated as a diagram in FIG. 7, in which feed forward control is combined with feedback control (though either or both may be used).

The combined control algorithm 360, as noted above, includes a feed forward algorithm portion 362 and a feedback algorithm portion 364. The feed forward algorithm portion 362, as illustrated, generally corresponds to the feed forward control algorithm 320 depicted in FIG. 6, except that the fuel flow reference value 340 generated via the third calculation 338 is instead referred to as a feed forward component 366. The feed forward component 366 may be, in some embodiments, subjected to a first gain 367, which may be configured to adjust the feed forward component 366 by a factor of between 0 and 1 (i.e., the first gain 367 may multiply the feed forward component 366 by any value between 0 and 1). In this way, the full value of the feed forward component 366 may be utilized (at a gain value of 1), or the feed forward component 366 may not be utilized at all (at a gain value of 0) in determining the overall output of the algorithm 360.

The feedback portion 364 of the combined control algorithm 360 includes the use of $\Phi_{REF}$ 330, which, as noted above, can be considered to be a target value that is pre-programmed into the controller 118, or otherwise input into the controller 118 by a user. The feedback portion 364 also uses a measured equivalence ratio 368, denoted in FIG. 7 as $\Phi_M$, and may be generated based on $O_2$ concentration information obtained by the exhaust oxygen sensor 288, and/or other sensors (e.g., CO sensors, $CH_4$ sensors, $H_2$ sensors). In certain embodiments, $\Phi_M$ 368 may be calculated by the controller 118 based on sensor outputs from any one or a combination of these sensors. For example, the controller 118 may utilize a tabular relationship between the detected amount of $O_2$ in the exhaust gas 60 and a correlated fuel-to-oxidant ratio and/or equivalence ratio associated with that amount to determine $\Phi_M$ 368. In other embodiments, discussed in detail below with respect to FIG. 8, the controller 118 may utilize one or more emissions models, such as models associating measured $O_2$ levels to appropriate fuel-to-oxidant ratios and/or appropriate equivalence ratios to determine $\Phi_M$ 368. In still other embodiments, an output of the $O_2$ sensor 288 may be replaced with, or used in addition to, one or more outputs of temperature sensors positioned at or proximate one or more catalysts used for treatment of the exhaust gas 42. For example, one or more temperature sensors may be associated with a CO catalyst within the EG processing system 54, and a rise in the detected temperature may be associated with increased levels of CO in the exhaust gas 42 (due to increased catalyst activity). Therefore, the temperature at the catalyst treatment may be correlative to the levels of CO in the exhaust gas 42, which may be used to determine a fuel-to-air ratio and/or $\Phi_M$ 368.

More particularly, the feedback portion 364 performs a feedback operation 370, which includes determining a deviation 372 or error. The deviation 372 may generally correspond to the difference between $\Phi_{REF}$ 330 (e.g., a set point value for the equivalence ratio) and $\Phi_M$ (e.g., a process value for the equivalence ratio). In other words, the feedback operation 370 determines the extent to which the process outcome differs from the predetermined or desired outcome. In one embodiment, the feedback operation 370 may include subtracting $\Phi_M$ from $\Phi_{REF}$, where a negative value for the deviation 372 may indicate that the process (e.g., of combustion) is running rich (in the fuel 70), and a positive value for the deviation 372 may indicate that the process is running lean. Accordingly, as discussed in detail below, a negative value for the deviation 372 may result in a negative feedback input, where the flow of the fuel 70 is reduced, and a positive value for the deviation 372 may result in a positive feedback input, where the flow of the fuel 70 is augmented.

Using the deviation 372, any number of feedback control operations may be performed. For example, as illustrated, the deviation 372 is used as an input for a proportional-integral (PI) control or regulation calculation 374 to generate a feedback control component 376 (e.g., a fuel flow value resulting from the feedback portion 364). While the control or regulation calculation is depicted as including a PI control or regulation calculation, other such calculations, including but not limited to a proportional-integral-derivative (PID) control calculation, may be used. The PI or PID control calculation generally results in a fuel flow value that has a component that is proportional to the deviation 372, a component that is integral of the deviation 372 over time, and, in certain embodiments, a component that is derivative of the deviation 372 over time. Accordingly, it should be appreciated that the deviation 372 may be calculated at discrete intervals or time periods, where $\Phi_M$ 368 is calculated/determined/measured substantially continuously, intermittently, or at regular intervals such that the deviation 372 may be integrated/derived over time.

Without loss of generality, it should noted that the blocks 370, 372, 374 may be replaced by other calculations representative of other embodiments of feedback control algorithms, including, but not limited to: auto-tuning PID algorithms, state variable or state feedback controllers, state observers or estimators, Kalman filters, phase-plane, dead-beat and switching or bang-bang controllers.

Having determined both the feedback component 376 and the feed forward component 366 in the manner discussed above, the processor 120 executes the one or more sets of instructions to perform a combining operation 378 in which the feed forward component 366 and the feedback component 376 are combined. The combining operation 378 may involve multiplication, division, addition, subtraction, averaging, or any other mathematical operation, using the feed forward component 366 and the feedback component 376. As noted above, the first gain 367 may be utilized to scale the feed forward component 366 between its full value and no value—i.e., all values between full contribution to the output of the algorithm 360 and no contribution to the output of the algorithm 360. Similarly, the feedback component 376 may be scaled by a second gain 377, which is configured to adjust the feedback component 376 by a factor of between 0 and 1 (i.e., the second gain 377 may multiply the feed forward component 366 by any value between 0 and 1). In this way, the full value of the feedback component 376 may be utilized (at a gain value of 1), or the feedback component 376 may not be utilized at all (at a gain value of 0) in determining the overall output of the algorithm 360. Thus, the combining operation 378, in some embodiments, may represent a scaled blending of the feed forward and feedback components 366, 376. Any manner of blending these two components may be used. Thus, in some embodiments, the algorithm 360 enables the use of only feed forward control, only feedback control, or a combination thereof.

In one embodiment, the combining operation 378 may involve adding the feed forward component 366 and the feedback component 376 (or their scaled values generated by the first and second gains 367, 377, respectively). By way of non-limiting example, in embodiments where the feed forward component 366 is a large positive number representing an increase in fuel flow (e.g., due to a low concentration of CO in the fuel 70), but the feedback component 376 is a small negative number representing a decrease in fuel flow (e.g., due to slight variations in combustion dynamics, flow), the feedback component 376 may trim the feed forward component 366 such that a fuel flow reference value 380 (e.g., a control signal) generated at the combining operation 378 accounts for flow rates and flow compositions of the fuel 70 and oxidant 68, and also accounts for measurement imperfections, process variability, actual combustion dynamics, etc. After the fuel flow reference value 380 is determined, it is provided to the fuel system 342 as described above for appropriate control of the flow of the fuel 70 along the fuel supply path 262.

While the embodiments disclosed above generally relate to the control of the fuel 70, it should be noted that they may be similarly applied to the oxidant 68. For example, in certain embodiments, similar actions to those described above may be applied to the oxidant 68 while holding the flow of the fuel 70 at a substantially constant flow rate, or while adjusting the flow of the fuel 70 according to other process targets unrelated to stoichiometric combustion. Therefore, in certain embodiments, the feed forward component 366 may establish a baseline flow rate for the oxidant 68 along the oxidant supply path 264, while the feedback component 376 refines the oxidant flow rate and corrects the flow rate for drift and other variations in flow, composition, or similar factors.

Figure 8:
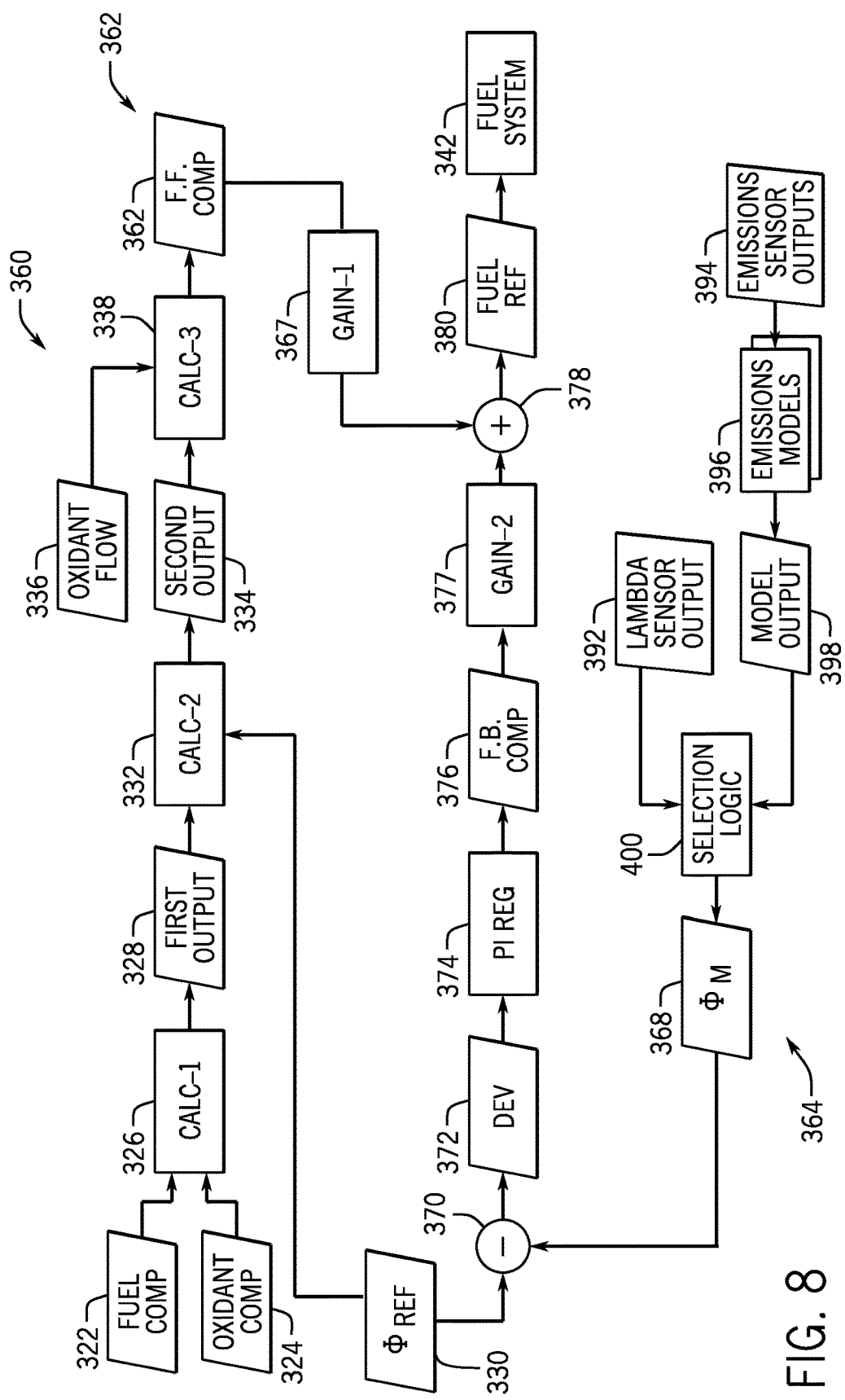
FIG. 8 is an embodiment of a process for determining a control input for operating the equivalence ratio control system of FIG. 5.

Furthermore, while the feedback portion 364 depicts $\Phi_M$ 368 as being input to the combined control algorithm 360 from one or more sensors, in other embodiments, $\Phi_M$ 368 may be generated through the use of one or more model-based programs, as depicted in FIG. 8. In particular, FIG. 8 is a process diagram illustrating an embodiment of a combined control algorithm 390 in which the feedback portion 364 uses a lambda sensor (e.g., an oxygen sensor placed along an exhaust path) to produce a lambda sensor output 392 (e.g., an output of the exhaust oxygen sensor 288) and one or more outputs 394 of various emissions sensors, which may be positioned along the exhaust gas recirculation path 110 (FIGS. 2, 5). Again, such emissions sensors may include additional oxygen sensors, CO sensors, $H_2$ sensors, or similar sensors. As noted above, with respect to FIG. 7, in other embodiments, the emissions sensor outputs 394 and/or the lambda sensor output 392 may be replaced with, or used in addition to, one or more outputs of temperature sensors positioned at or proximate one or more catalysts used for treatment of the exhaust gas 42. For example, one or more temperature sensors may be associated with a CO catalyst within the EG processing system 54, and a rise in the detected temperature may be associated with increased levels of CO in the exhaust gas 42. Therefore, the temperature at the catalyst treatment may be correlative to the levels of CO in the exhaust gas 42, which may be used to determine $\Phi_M$ 368 according to the process described below.

As depicted, the emissions sensor outputs 394, which may be sensor data indicative of amounts of CO, $H_2$, $O_2$, or other emissions, in the exhaust gas 42, are provided to one or more emissions models 396. The emissions models 396, in a general sense, may combine data relating detected amounts of CO, $H_2$, $O_2$, to $\Phi$ (i.e., the current or measured equivalence ratio), which enables broader band sensing and, in certain embodiments, more accurate determination of $\Phi$ compared to the use of only $O_2$, CO, and/or $H_2$ sensors alone. The emissions models 396 may be implemented as code stored on the memory 122 of the controller 118, wherein the processor 120 executes the stored code, which may include a modeling module having one or more sets of instructions, to run the modeling disclosed herein.

In accordance with present embodiments, the one or more emissions models 396 may be any suitable type of model capable of correlating the emissions sensor outputs 394 to $\Phi$. By way of non-limiting example, the emissions models 396 may include physics-based models, computational fluid dynamics (CFD) models, or finite element analysis (FEA) models. Models may also include artificial intelligence (AI) models, such as expert systems (e.g. forward chained expert systems, backward chained expert systems), neural networks, fuzzy logic systems, state vector machines (SVMs), inductive reasoning systems, Bayesian inference systems, or a combination thereof.

The emissions models 396 may also, additionally or alternatively, include statistical models, such as regression analysis models, data mining models (e.g., clustering models, classification models, association models), and the like. For example, clustering techniques may discover groups or structures in the data that are in some way "similar." Classification techniques may classify data points as members of certain groups, for example, sensor outputs providing an indication that $\Phi$ may be larger or smaller than desired. Regression analysis may be used to find functions capable of modeling future trends within a certain error range. Association techniques may be used to find relationship between variables. Indeed, any or all of such models are presently contemplated and are within the scope of the present disclosure.

The one or more emissions models 396 may provide a model output 398, which, in one embodiment, may include an estimated (e.g., modeled) value for $\Phi_M$ (e.g., an estimated equivalence ratio), an estimated fuel-to-oxidant ratio, or both, based on the emissions models 396 and the emissions sensor outputs 394. In other embodiments, the model output 398 may provide a weighting factor or other modifying element configured to modify the data output by the various emissions sensors, which the controller 118 uses to determine $\Phi_M$. For example, in such embodiments, the model output 398 may be a weighting factor that weights the lambda sensor output 392 (e.g., a sensor output indicative of the $O_2$ concentration in the exhaust gas 42) to account for other sensed variables, such as CO concentrations, $H_2$ concentrations, or the like. In still other embodiments, the model output 398 may include a tabulation of potential values for a fuel-to-oxidant ratio, $\Phi_M$, or both, and the controller 118 may select an appropriate value for the fuel-to-oxidant ratio and/or $\Phi_M$ based on the lambda sensor output 392.

Accordingly, the processor 120 of the controller 118 may execute the one or more sets of instructions stored on the memory 122 to carry out selection logic 400. The selection logic 400 may select between various values for $\Phi_M$ based on the lambda sensor output 392 and the model output 398 (e.g., a table of $\Phi_M$ values), or may select between values of $\Phi_M$ output by the emissions models 396 and values of $\Phi_M$ generated by analysis of the lambda sensor output 392. In either case, the selection logic 400 selects an appropriate value for $\Phi_M$ 368, which is used in the algorithm 390 in the same manner as discussed above with respect to the algorithm 360 of FIG. 7 to generate the feedback component 376.

Figure 9:
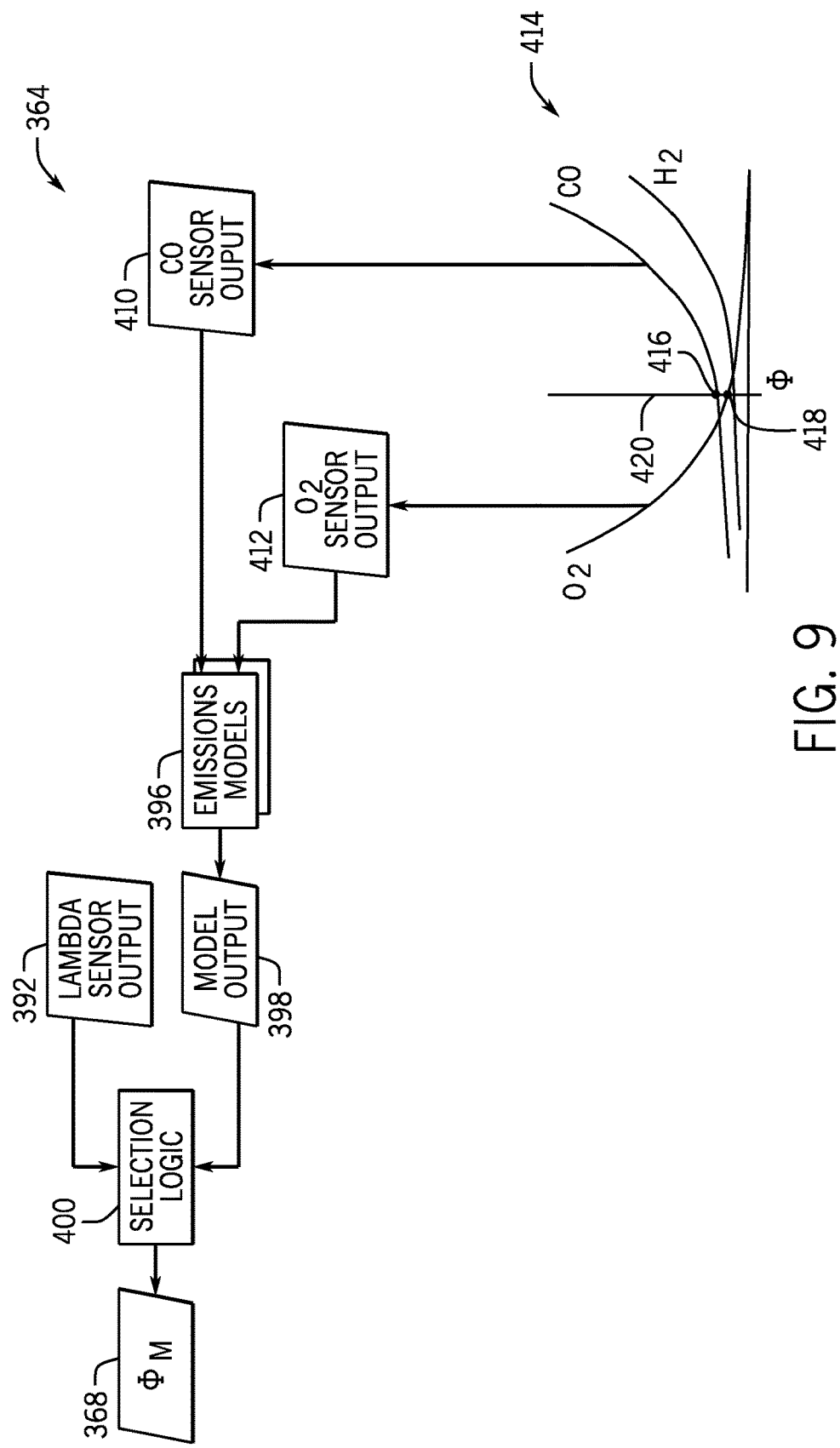
FIG. 9 is an embodiment of a process for determining a measured equivalence ratio using a combination of measured and modeled values related to the exhaust gas generated during operation of the gas turbine system of FIGS. 1-3 and 5.

FIG. 9 is a diagram depicting an embodiment of the manner in which the emissions models 396 utilize the emissions sensor outputs 394 to modify or otherwise affect the selection of an appropriate value for $\Phi_M$ 368 by the selection logic 400. In particular, as illustrated, the one or more emissions models 396 receive a CO emission sensor output 410 and an $O_2$ sensor output 412. In the illustrated embodiment, the emissions models 396 correlate the outputs 410, 412 with particular values for $\Phi$, as illustrated by graphical inset 414. As depicted by the inset 414, the emissions models 396 may identify a concentration or other value 416 related to the CO within the exhaust gas 42, and may identify a concentration or other value 418 related to the $O_2$ within the exhaust gas 42. The emissions models 396 may also associate the particular values 416, 418 with a value for $\Phi$, which is depicted as a line 420 in the insert 414. As depicted in the insert 414, the values 416, 418 are dependent on one another. That is, as the $O_2$ value 418 increases, the CO value 416 decreases, and vice-versa. The emissions models 396 are therefore able to use one ($O_2$, CO, or $H_2$), two ($O_2$ and CO, $O_2$ and $H_2$, or CO and $H_2$), three ($O_2$, CO, and $H_2$) values, or more, to identify a suitable value for $\Phi_M$. Again, as discussed above, the emissions models 396 provide the model output 398 to the selection logic 400, which may select between the model output 398 and the lambda sensor output 392, may modify the lambda sensor output 392 based on the model output 398, or may modify the model output 398 based on the lambda sensor output 392 to determine an appropriate value for $\Phi_M$ 368.

It should be noted that all control algorithms discussed herein may be similarly utilized to control the flow of the oxidant 68 along the oxidant supply path 264. In some embodiments in which the oxidant flow is controlled, air-to-fuel ratios (AFR) may be used rather than fuel-to-oxidant ratios, and air-fuel equivalence ratios ($\lambda$) may be used rather than fuel-air equivalence ratios ($\Phi$), where $\Phi=\lambda^{-1}$.

Additional Description

The present embodiments provide a system and method for controlling oxidant and/or fuel flow for combustion at predetermined ratios (e.g., stoichiometric combustion) in exhaust gas recirculation gas turbine engines. It should be noted that any one or a combination of the features described above may be utilized in any suitable combination. Indeed, all permutations of such combinations are presently contemplated. By way of example, the following clauses are offered as further description of the present disclosure:

Embodiment 1

A gas turbine system comprising: a controller, comprising: one or more tangible, non-transitory, machine-readable media collectively storing one or more sets of instructions; and one or more processing devices configured to execute the one or more sets of instructions to: receive fuel composition information related to a fuel used for combustion in a turbine combustor of the gas turbine system; receive oxidant composition information related to an oxidant used for combustion in the turbine combustor of the gas turbine system; receive oxidant flow information related to a flow of the oxidant to the turbine combustor; determine a stoichiometric fuel-to-oxidant ratio ($FOR_{ST}$) based at least on the fuel composition information and the oxidant composition information; generate a control signal for input to a fuel flow control system configured to control a flow of the fuel to the turbine combustor based on the oxidant flow information, a target equivalence ratio, and $FOR_{ST}$ to enable combustion at the target equivalence ratio in the presence of an exhaust gas diluent.

Embodiment 2

The gas turbine system of embodiment 1, comprising: an oxidant flow path configured to deliver the flow of the oxidant to the turbine combustor; and an oxygen sensor disposed along the oxidant flow path, wherein the oxygen sensor is communicatively coupled to the controller, and the oxygen sensor is configured to determine the oxidant composition information.

Embodiment 3

The gas turbine system of any preceding embodiment, wherein the oxidant composition information comprises a concentration of oxygen in the oxidant.

Embodiment 4

The gas turbine system of any preceding embodiment, comprising an oxidant flow meter disposed along the oxidant flow path, wherein the oxidant flow meter is communicatively coupled to the controller, and the oxidant flow meter is configured to determine the oxidant flow information.

Embodiment 5

The gas turbine system of any preceding embodiment, wherein the oxidant flow information comprises a flow rate of the flow of the oxidant to the turbine combustor.

Embodiment 6

The gas turbine system of any preceding embodiment, comprising: a fuel flow path configured to deliver the flow of the fuel to the turbine combustor; and a fuel analysis system configured to receive a slip stream of the fuel from the fuel flow path, wherein the fuel analysis system is communicatively coupled to the controller, and the fuel analysis system is configured to determine the fuel composition information.

Embodiment 7

The gas turbine system of any preceding embodiment, wherein the fuel analysis system comprises a gas chromatograph, a fuel analyzer, an infrared spectrometer, an ultraviolet/visible spectrometer, or any combination thereof.

Embodiment 8

The gas turbine system of any preceding embodiment, wherein the one or more processing devices are configured to execute the one or more sets of instructions to determine a reference fuel-to-oxidant ratio ($FOR_{REF}$) using $FOR_{ST}$ and the target equivalence ratio, and use $FOR_{REF}$ to generate a feed forward component, wherein the feed forward component comprises at least a portion of the control signal for input to the fuel flow control system.

Embodiment 9

The gas turbine system of any preceding embodiment, wherein the feed forward component is configured to establish a baseline flow rate for the flow of the fuel to the turbine combustor.

Embodiment 10

The gas turbine system of any preceding embodiment, wherein the feed forward component is generated via execution of the one or more sets of instructions by multiplying the oxidant flow information by $FOR_{REF}$.

Embodiment 11

The gas turbine system of any preceding embodiment, comprising the fuel flow control system, wherein the fuel flow control system is disposed along the fuel flow path, and the fuel flow control system comprises at least one fuel flow control valve, wherein the at least one fuel flow control valve is configured to adjust its position in response to the control signal.

Embodiment 12

The gas turbine system of any preceding embodiment, comprising: an exhaust flow path configured to flow an exhaust gas generated from combustion products produced by combustion of the fuel and oxidant within the turbine combustor, wherein the exhaust flow path comprises: a turbine configured to extract work from the combustion products to drive a shaft of the gas turbine system and to generate the exhaust gas; an exhaust compressor driven by the shaft of the gas turbine system, wherein the compressor is configured to compress the exhaust gas from the turbine to generate the exhaust diluent for use within the turbine combustor; and one or more exhaust sensors disposed along the exhaust flow path between the turbine and the exhaust compressor, wherein the one or more exhaust sensors are communicatively coupled to the controller, and the one or more exhaust sensors are configured to determine exhaust composition information related to the exhaust gas; and wherein the one or more processing devices are configured to execute the one or more sets of instructions to generate a feedback component using the exhaust composition information and the target equivalence ratio, and the feedback component comprises at least a portion of the control signal for input to the fuel flow control system.

Embodiment 13

The gas turbine system of any preceding embodiment, wherein the exhaust composition information comprises an oxygen concentration, a fuel concentration, a fuel-to-oxidant ratio, an equivalence ratio or any combination thereof, of the exhaust.

Embodiment 14

The gas turbine system of any preceding embodiment, wherein the feedback control component is generated via execution of the one or more sets of instructions by performing a proportional integral (PI) control algorithm, or proportional integral derivative (PID) control algorithm, using the target equivalence ratio as a set point and a measured equivalence ratio of the exhaust gas as a process value.

Embodiment 15

The gas turbine system of any preceding embodiment, wherein the measured equivalence ratio of the exhaust is generated via execution of the one or more sets of instructions by comparing the exhaust composition information with emissions models accounting for oxygen levels, carbon monoxide levels, hydrogen levels, or any combination thereof.

Embodiment 16

The gas turbine system of any preceding embodiment, wherein the feedback component is configured to adjust a flow of the fuel to the turbine combustor to account for drift and variations in a flow rate of the fuel to the turbine combustor.

Embodiment 17

The gas turbine system of any preceding embodiment, wherein the one or more exhaust sensors comprise a lambda sensor, a carbon monoxide sensor, a hydrogen sensor, a humidity sensor, or any combination thereof.

Embodiment 18

The gas turbine system of any preceding embodiment, wherein the target equivalence ratio is 1.0 plus or minus 0.01, 0.02, 0.03, 0.04, or 0.05 fuel to oxygen in the oxidant.

Embodiment 19

The gas turbine system of any preceding embodiment, comprising: the turbine combustor, wherein the turbine combustor is configured to receive the flow of the oxidant, the flow of the fuel, and the exhaust diluent; and an exhaust extraction flow path coupled to the turbine combustor, wherein the exhaust extraction flow path is configured to flow at least a portion of the exhaust diluent from the turbine combustor to a downstream process as an extracted exhaust gas.

Embodiment 20

The gas turbine system of any preceding embodiment, wherein the downstream process comprises an enhanced oil recovery (EOR) system.

Embodiment 21

The gas turbine system of any preceding embodiment, wherein the one or more processing devices are configured to execute the one or more sets of instructions to control the flow of the fuel in response to the flow of the oxidant to enable combustion at the target equivalence ratio.

Embodiment 22

A gas turbine system, comprising: a turbine combustor configured to combust a fuel and an oxidant at a target equivalence ratio in the presence of an exhaust diluent to produce combustion products; an oxidant path configured to deliver the oxidant to the turbine combustor at an oxidant flow rate; a fuel path configured to deliver the fuel to the turbine combustor at a fuel flow rate, wherein the fuel path comprises a fuel flow control system configured to adjust the fuel flow rate in response to one or more control signals; and a controller communicatively coupled to the flow control system, wherein the controller comprises: one or more non-transitory, machine readable media collectively storing one or more sets of instructions; and one or more processing devices configured to execute the one or more sets of instructions to provide the one or more control signals to the fuel flow control system, wherein the one or more control signals control the fuel flow rate to the combustor to enable combustion in the turbine combustor at the target equivalence ratio, wherein the one or more control signals comprise a feedback component and a feed forward component.

Embodiment 23

The gas turbine system of any preceding embodiment, wherein the one or more processing devices are configured to execute the one or more sets of instructions to determine the feed forward component based at least on a composition of the fuel, a composition of the oxidant, and the oxidant flow rate.

Embodiment 24

The gas turbine system of any preceding embodiment, wherein the one or more processing devices are configured to execute the one or more sets of instructions to determine the feed forward component by: determining a stoichiometric fuel-to-oxidant ratio ($FOR_{ST}$) based on oxidant composition information related to the oxidant and fuel composition information relating to the fuel; determining a reference fuel-to-oxidant ratio ($FOR_{REF}$) based on $FOR_{ST}$ and the target equivalence ratio; and generating the feed forward component using $FOR_{REF}$ and the oxidant flow rate.

Embodiment 25

The gas turbine system of any preceding embodiment, wherein the feed forward component is configured to establish a baseline flow rate for the flow of the fuel to the turbine combustor.

Embodiment 26

The gas turbine system of any preceding embodiment, comprising a fuel analysis system configured to receive a slip stream of the fuel from the fuel path, wherein the fuel analysis system is configured to determine the fuel composition information.

Embodiment 27

The gas turbine system of any preceding embodiment, wherein the fuel analysis system comprises a gas chromatograph, a fuel analyzer, an infrared spectrometer, an ultraviolet/visible spectrometer, or any combination thereof.

Embodiment 28

The gas turbine system of any preceding embodiment, wherein the one or more processing devices are configured to execute the one or more sets of instructions to determine the feedback component by: determining a deviation based on the target equivalence ratio and a measured equivalence ratio of the exhaust diluent; and generating the feedback component by running a proportional integral (PI) or proportional integral derivative (PID) control algorithm using the deviation as an input.

Embodiment 29

The gas turbine system of any preceding embodiment, comprising an exhaust flow path configured to flow an exhaust gas generated from combustion products produced within the turbine combustor, wherein the exhaust flow path comprises: a turbine configured to extract work from the combustion products to drive a shaft of the gas turbine system and produce the exhaust gas; an exhaust compressor driven by the shaft of the gas turbine system, wherein the compressor is configured to compress the exhaust gas from the turbine to produce the exhaust diluent; and one or more exhaust sensors disposed along the exhaust flow path between the turbine and the exhaust compressor, wherein the one or more exhaust sensors are communicatively coupled to the controller, and the one or more exhaust sensors are configured to determine exhaust composition information related to the exhaust gas; and wherein the one or more processing devices are configured to execute the one or more sets of instructions to determine the measured equivalence ratio of the exhaust gas from the exhaust composition information.

Embodiment 30

The gas turbine system of any preceding embodiment, wherein the exhaust composition information comprises an oxygen concentration, a fuel concentration, a fuel-to-oxidant ratio, or any combination thereof, of the exhaust.

Embodiment 31

The gas turbine system of any preceding embodiment, wherein the measured equivalence ratio of the exhaust diluent is generated via execution of the one or more sets of instructions by comparing the exhaust composition information with emissions models accounting for oxygen levels, carbon monoxide levels, hydrogen levels, or any combination thereof.

Embodiment 32

The gas turbine system of any preceding embodiment, wherein the feedback component is configured to adjust a flow of the fuel to the turbine combustor to account for drift and variations in the fuel flow rate.

Embodiment 33

The gas turbine system of any preceding embodiment, wherein the one or more exhaust sensors comprise a lambda sensor, a carbon monoxide sensor, a hydrogen sensor, a humidity sensor, or any combination thereof.

Embodiment 34

The gas turbine system of any preceding embodiment, wherein the target equivalence ratio is 1.0 plus or minus 0.01, 0.02, 0.03, 0.04, or 0.05 fuel to oxygen in the oxidant.

Embodiment 35

The gas turbine system of any preceding embodiment, comprising an exhaust extraction flow path coupled to the turbine combustor, wherein the exhaust extraction flow path is configured to flow at least a portion of the exhaust diluent from the turbine combustor to a downstream process as an extracted exhaust gas.

Embodiment 36

The gas turbine system of any preceding embodiment, wherein the downstream process comprises an enhanced oil recovery (EOR) system.

Embodiment 37

The gas turbine system of any preceding embodiment, wherein the one or more processing devices are configured to execute the one or more sets of instructions to control the fuel flow rate in response to the oxidant flow rate to enable combustion at the target equivalence ratio.

Embodiment 38

One or more non-transitory, machine readable media collectively storing one or more sets of instructions executable by one or more processing devices to: receive fuel composition information related to a fuel used for combustion in a turbine combustor of a gas turbine system; receive oxidant composition information related to an oxidant used for combustion in the turbine combustor of the gas turbine system; receive oxidant flow information related to a flow of the oxidant to the turbine combustor; determine a stoichiometric fuel-to-oxidant ratio ($FOR_{ST}$) based at least on the fuel composition information and the oxidant composition information; determine a reference fuel-to-oxidant ratio ($FOR_{REF}$) using $FOR_{ST}$ and a target equivalence ratio; and generate a control signal for input to a fuel flow control system configured to control a flow of the fuel to the turbine combustor based on the oxidant flow information and $FOR_{REF}$ to enable combustion at the target equivalence ratio between the fuel and the oxidant in the presence of a recirculated exhaust gas within the turbine combustor.

Embodiment 39

The media of any preceding embodiment, wherein the oxidant composition information comprises a concentration of oxygen in the oxidant.

Embodiment 40

The media of any preceding embodiment, wherein the oxidant flow information comprises a flow rate of the flow of the oxidant to the turbine combustor.

Embodiment 41

The media of any preceding embodiment, wherein the one or more sets of instructions are executable by the one or more processing devices to generate a feed forward component using the oxidant flow information and $FOR_{REF}$, and the feed forward component comprises at least a portion of the control signal for input to the fuel flow control system.

Embodiment 42

The media of any preceding embodiment, wherein the feed forward component is configured to establish a baseline flow rate for the flow of the fuel to the turbine combustor.

Embodiment 43

The media of any preceding embodiment, wherein the feed forward component is generated via execution of the one or more sets of instructions by multiplying the oxidant flow information by $FOR_{REF}$.

Embodiment 44

The media of any preceding embodiment, wherein the one or more processing devices are configured to execute the one or more sets of instructions to generate a feedback component using exhaust composition information related to the recirculated exhaust gas and the target equivalence ratio, and the feedback component comprises at least a portion of the control signal for input to the fuel flow control system.

Embodiment 45

The media of any preceding embodiment, wherein the exhaust composition information comprises an oxygen concentration, a fuel concentration, a fuel-to-oxidant ratio, or any combination thereof, of the exhaust.

Embodiment 46

The media of any preceding embodiment, wherein the feedback control component is generated via execution of the one or more sets of instructions by performing a proportional integral (PI) control algorithm, or proportional integral derivative (PID) control algorithm, using the target equivalence ratio as a set point and a measured equivalence ratio of the recirculated exhaust gas as a process value.

Embodiment 47

The media of any preceding embodiment, wherein the measured equivalence ratio of the recirculated exhaust gas is generated via execution of the one or more sets of instructions by comparing the exhaust composition information with emissions models accounting for oxygen levels, carbon monoxide levels, hydrogen levels, or any combination thereof.

Embodiment 48

The media of any preceding embodiment, wherein the feedback component is configured to adjust a flow of the fuel to the turbine combustor to account for drift and variations in a flow rate of the fuel to the turbine combustor.

Embodiment 49

The media of any preceding embodiment, wherein the target equivalence ratio is 1.0 plus or minus 0.01, 0.02, 0.03, 0.04, or 0.05 fuel to oxygen in the oxidant.

Embodiment 50

The media or system of any preceding embodiment, wherein the combustion products resulting from combustion in the turbine combustor have substantially no unburnt fuel or oxidant remaining.

Embodiment 51

The media system of any preceding embodiment, wherein the combustion products resulting from combustion in the turbine combustor have less than approximately 10, 20, 30, 40, 50, 60, 70, 80, 90, 100, 200, 300, 400, 500, 1000, 2000, 3000, 4000, or 5000 parts per million by volume (ppmv) of oxidant unburnt fuel, nitrogen oxides (e.g., $NO_X$), carbon monoxide (CO), sulfur oxides (e.g., $SO_X$), hydrogen, and other products of incomplete combustion.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A non-transitory, computer-readable medium comprising computer-executable instructions which when executed are configured to cause a processor to:
   receive fuel composition information related to a fuel used for combustion in a turbine combustor of a gas turbine system;
   receive oxidant composition information related to an oxidant used for combustion in the turbine combustor of the gas turbine system;
   receive oxidant flow information related to a flow of the oxidant to the turbine combustor;
   determine a stoichiometric fuel-to-oxidant ratio ($FOR_{ST}$) based at least on the fuel composition information and the oxidant composition information;
   generate a control signal for input to a fuel flow control system configured to control a flow of the fuel to the turbine combustor using both a feed forward component and a feedback component to enable combustion at the target equivalence ratio in the presence of an exhaust gas diluent;
   adjust a fuel flow control valve of the fuel flow control system based on the control signal, wherein the control signal is configured to increase a flow of the fuel to the turbine combustor when the feedback component, or the feed forward component, or both are a positive value;
   wherein the feed forward component is based on the oxidant flow information, a target equivalence ratio, and $FOR_{ST}$; and
   wherein the feedback component comprises a measured equivalence ratio determined based at least in part on an emissions model output and a lambda sensor output, the emissions model output is based on feedback from one or more exhaust sensors indicative of exhaust composition information of an exhaust gas generated from combustion products from the turbine combustor, and the one or more exhaust sensors comprises a hydrogen sensor or a carbon monoxide sensor.

2. A gas turbine system, comprising:
   a turbine combustor configured to combust a fuel and an oxidant at a target equivalence ratio in the presence of an exhaust diluent to produce combustion products;
   an oxidant path configured to deliver the oxidant to the turbine combustor at an oxidant flow rate;
   a fuel path configured to deliver the fuel to the turbine combustor at a fuel flow rate, wherein the fuel path comprises a fuel flow control system configured to adjust the fuel flow rate in response to one or more control signals;
   an exhaust compressor driven by a shaft of the gas turbine system, wherein the exhaust compressor is configured to receive and compress only an exhaust gas generated from the combustion products and to direct the exhaust diluent to the turbine combustor;
   a controller communicatively coupled to the fuel flow control system, wherein the controller comprises:
     one or more non-transitory, machine readable media collectively storing one or more sets of instructions; and
     one or more processing devices configured to execute the one or more sets of instructions to provide the one or more control signals to the fuel flow control system, wherein a fuel flow control valve of the fuel flow control system is adjusted based on the one or more control signals to adjust the fuel flow rate to the turbine combustor to enable combustion in the turbine combustor at the target equivalence ratio, wherein the one or more control signals comprise a feedback component and a feed forward component, wherein the feed forward component is based on the oxidant flow rate, a target equivalence ratio, and a stoichiometric fuel-to-oxidant ratio ($FOR_{ST}$), wherein the feedback component comprises a measured equivalence ratio determined based at least in part on an emissions model output and a lambda sensor output, wherein the emissions model output is based on feedback from one or more exhaust sensors indicative of exhaust composition information of an exhaust gas generated from combustion products from the turbine combustor, wherein the one or more exhaust sensors comprises a hydrogen sensor or a carbon monoxide sensor, wherein the control signal is configured to reduce a flow of the fuel to the turbine combustor when the feedback component, or the feed forward component, or both are a negative value; and
   an oxygen sensor disposed along the oxidant path, wherein the oxygen sensor is communicatively coupled to the controller, and the oxygen sensor is configured to determine oxidant composition information.

3. The gas turbine system of claim 2, comprising an exhaust flow path configured to flow the exhaust gas generated from the combustion products produced within the turbine combustor, wherein the exhaust flow path comprises:
   a turbine configured to extract work from the combustion products to drive the shaft of the gas turbine system and generate the exhaust gas;
   the exhaust compressor; and
   the one or more exhaust sensors, wherein the one or more exhaust sensors is disposed along the exhaust flow path between the turbine and the exhaust compressor, and wherein the one or more exhaust sensors are communicatively coupled to the controller.

4. The gas turbine system of claim 2, wherein the feedback component is configured to adjust the fuel flow rate to the turbine combustor to account for drift and variations in the fuel flow rate.

5. The gas turbine system of claim 2, comprising an exhaust extraction flow path coupled to the turbine combustor, wherein the exhaust extraction flow path is configured to flow at least a portion of the exhaust gas from the turbine combustor to an enhanced oil recovery (EOR) system as an extracted exhaust gas.

6. The gas turbine system of claim 5, comprising:
an exhaust extraction flow meter disposed along the exhaust extraction flow path, wherein the exhaust extraction flow meter is communicatively coupled to the controller, and the exhaust extraction flow meter is configured to determine flow information relating to the extracted exhaust gas from the turbine combustor; and
an exhaust extraction flow control valve disposed along the exhaust extraction flow path, wherein the exhaust extraction flow control valve is communicatively coupled to the controller, and the exhaust extraction flow control valve is configured to at least partially adjust an amount of the extracted exhaust gas from the turbine combustor.

7. The gas turbine system of claim 2, wherein an emissions model is configured to generate the emissions model output, and wherein the emissions model comprises a physics-based model, a computational fluid dynamics model, a finite element analysis model, an artificial intelligence model, a statistical model, or any combination thereof.

8. A gas turbine system comprising:
a controller, comprising:
one or more tangible, non-transitory, machine-readable media collectively storing one or more sets of instructions; and
one or more processing devices configured to execute the one or more sets of instructions to:
receive fuel composition information related to a fuel used for combustion in a turbine combustor of the gas turbine system;
receive oxidant composition information related to an oxidant used for combustion in the turbine combustor of the gas turbine system;
receive oxidant flow information related to a flow of the oxidant to the turbine combustor;
determine a stoichiometric fuel-to-oxidant ratio ($FOR_{ST}$) based at least on the fuel composition information and the oxidant composition information;
generate a control signal for input to a fuel flow control system configured to control a flow of the fuel to the turbine combustor using both a feed forward component and a feedback component to enable combustion at the target equivalence ratio in the presence of an exhaust gas diluent, wherein the feed forward component is based on the oxidant flow information, a target equivalence ratio, and $FOR_{ST}$, and wherein the feedback component comprises a measured equivalence ratio determined based at least in part on an emissions model output and a lambda sensor output, wherein the emissions model output is based on feedback from one or more exhaust sensors indicative of exhaust composition information of an exhaust gas generated from combustion products from the turbine combustor, and wherein the one or more exhaust sensors comprises a hydrogen sensor or a carbon monoxide sensor; and
adjust a fuel flow control valve of the fuel flow control system based on the control signal, wherein the control signal is configured to increase a flow of the fuel to the turbine combustor when the feedback component, or the feed forward component, or both are a positive value;
an oxidant flow path configured to deliver the flow of the oxidant to the turbine combustor;
an oxygen sensor disposed along the oxidant flow path, wherein the oxygen sensor is communicatively coupled to the controller, and the oxygen sensor is configured to determine the oxidant composition information; and
an exhaust compressor driven by a shaft of the gas turbine system, wherein the exhaust compressor is configured to receive and compress only an exhaust gas generated from combustion products from the turbine combustor and to direct the exhaust gas diluent to the turbine combustor.

9. The gas turbine system of claim 8, comprising an oxidant flow meter disposed along the oxidant flow path, wherein the oxidant flow meter is communicatively coupled to the controller, and the oxidant flow meter is configured to determine the oxidant flow information.

10. The gas turbine system of claim 8, comprising:
a fuel flow path configured to deliver the flow of the fuel to the turbine combustor; and
a fuel analysis system configured to receive a slip stream of the fuel from the fuel flow path, wherein the fuel analysis system is communicatively coupled to the controller, and the fuel analysis system is configured to determine the fuel composition information.

11. The gas turbine system of claim 10, wherein the one or more processing devices are configured to execute the one or more sets of instructions to determine a reference fuel-to-oxidant ratio ($FOR_{REF}$) using $FOR_{ST}$ and the target equivalence ratio, and use $FOR_{REF}$ to generate the feed forward component, wherein the feed forward component causes the fuel flow control system to establish a baseline flow rate for the flow of the fuel to the turbine combustor, and is generated via execution of the one or more sets of instructions by multiplying the oxidant flow information by $FOR_{REF}$.

12. The gas turbine system of claim 8, comprising:
an exhaust flow path configured to flow the exhaust gas generated from the combustion products produced by combustion of the fuel and oxidant within the turbine combustor, wherein the exhaust flow path comprises:
a turbine configured to extract work from the combustion products to drive the shaft of the gas turbine system;
the exhaust compressor; and
the one or more exhaust sensors, wherein the one or more exhaust sensors is disposed along the exhaust flow path between the turbine and the exhaust compressor, wherein the one or more exhaust sensors are communicatively coupled to the controller.

13. The gas turbine system of claim 8, wherein the exhaust composition information comprises an oxygen concentration, a fuel concentration, a fuel-to-oxidant ratio, or any combination thereof, of the exhaust gas.

14. The gas turbine system of claim 8, wherein the feedback control component is generated via execution of the one or more sets of instructions by performing a proportional integral (PI) control algorithm, or proportional integral derivative (PID) control algorithm, using the target equivalence ratio as a set point and the measured equivalence ratio of the exhaust gas as a process value.

15. The gas turbine system of claim 8, wherein the feedback component is configured to adjust the flow of the fuel to the turbine combustor to account for drift and variations in the flow of the fuel to the turbine combustor.

16. The gas turbine system of claim 8, comprising:
an exhaust extraction flow path coupled to the turbine combustor, wherein the exhaust extraction flow path is configured to flow at least a portion of the exhaust gas diluent from the turbine combustor to a downstream process as an extracted exhaust gas;
an exhaust extraction flow meter disposed along the exhaust extraction flow path, wherein the exhaust extraction flow meter is communicatively coupled to the controller, and the exhaust extraction flow meter is configured to determine flow information relating to the extracted exhaust gas from the turbine combustor; and
an exhaust extraction flow control valve disposed along the exhaust extraction flow path, wherein the exhaust extraction flow control valve is communicatively coupled to the controller, and the exhaust extraction flow control valve is configured to at least partially adjust an amount of the extracted exhaust gas from the turbine combustor; and wherein the turbine combustor is configured to receive the flow of the oxidant, the flow of the fuel, and the exhaust gas diluent.

17. The gas turbine system of claim 2, wherein an emissions model is configured to generate the emissions model output, and wherein the emissions model comprises a physics-based model, a computational fluid dynamics model, a finite element analysis model, an artificial intelligence model, a statistical model, or any combination thereof.

18. The gas turbine system of claim 8, wherein the one or more exhaust sensors comprise an oxygen sensor, the carbon monoxide sensor, and the hydrogen sensor.

19. The gas turbine system of claim 8, wherein the feedback component is determined based on a comparison of the measured equivalence ratio and the target equivalence ratio.

* * * * *